(12) United States Patent
Ying et al.

(10) Patent No.: US 12,200,725 B2
(45) Date of Patent: Jan. 14, 2025

(54) USER EQUIPMENT, BASE STATIONS AND SIGNALING FOR ENHANCED UPLINK TRANSMISSIONS

(71) Applicant: SHARP KABUSHIKI KAISHA, Sakai (JP)

(72) Inventors: Kai Ying, Vancouver, WA (US); Tatsushi Aiba, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 421 days.

(21) Appl. No.: 17/637,985

(22) PCT Filed: Sep. 23, 2020

(86) PCT No.: PCT/JP2020/035867
§ 371 (c)(1),
(2) Date: Feb. 24, 2022

(87) PCT Pub. No.: WO2021/060301
PCT Pub. Date: Apr. 1, 2021

(65) Prior Publication Data
US 2022/0287075 A1  Sep. 8, 2022

Related U.S. Application Data

(60) Provisional application No. 62/904,868, filed on Sep. 24, 2019.

(51) Int. Cl.
*H04W 72/23* (2023.01)
*H04L 1/00* (2006.01)
*H04L 1/08* (2006.01)

(52) U.S. Cl.
CPC .......... *H04W 72/23* (2023.01); *H04L 1/0061* (2013.01); *H04L 1/08* (2013.01)

(58) Field of Classification Search
CPC ......... H04W 72/1268; H04W 72/1263; H04W 72/1289; H04W 72/14; H04W 72/23; H04W 72/126; H04W 72/128; H04L 1/0061; H04L 1/08; H04L 1/006
See application file for complete search history.

(56) References Cited

U.S. PATENT DOCUMENTS

| | | | | |
|---|---|---|---|---|
| 2012/0113866 A1* | 5/2012 | Tenny | ............ | H04W 24/10 370/254 |
| 2021/0314982 A1* | 10/2021 | Panteleev | ............ | H04L 5/0053 |
| 2022/0264608 A1* | 8/2022 | Bae | ............ | H04L 1/0072 |

* cited by examiner

*Primary Examiner* — Wei Zhao
(74) *Attorney, Agent, or Firm* — ScienBiziP, P.C.

(57) ABSTRACT

A user equipment (UE) is described. The UE includes receiving circuitry configured to receive signaling that comprises a configuration for a configured grant physical uplink shared channel (PUSCH) or a grant-based PUSCH. The UE also includes a higher layer processor configured to determine whether to use multi-segment transmissions and mini-slot repetitions for the configured grant PUSCH or grant-based PUSCH. The UE further includes transmitting circuitry configured to transmit the multi-segment transmissions and the mini-slot repetitions for the configured grant PUSCH or grant-based PUSCH.

3 Claims, 17 Drawing Sheets

[Fig. 9]

USER EQUIPMENT, BASE STATIONS AND SIGNALING FOR ENHANCED UPLINK TRANSMISSIONS

TECHNICAL FIELD

The present disclosure relates generally to communication systems. More specifically, the present disclosure relates to user equipments, base stations and signaling for enhanced uplink transmissions.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility, and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE) that communicates with a base station comprising: receiving circuitry configured to: receive a Radio Resource Control (RRC) message including first information indicating a repetition type for configured grant (CG) Physical Uplink Shared Channel (PUSCH) transmission(s), receive a RRC message including second information indicating a repetition type for grant based (GB) PUSCH transmission(s), transmitting circuitry configured to: perform the CG PUSCH transmission(s) based on the first information, perform, based on a detection of a physical downlink control channel (PDCCH) with Cyclic Redundancy Check (CRC) scrambled by Cell Radio Network Temporary Identifier (C-RNTI), the GB PUSCH transmission(s) based on the second information, perform, based on a detection of a PDCCH with CRC scrambled by Configured Scheduling Radio Network Temporary Identifier (CS-RNTI) with New Data Indicator (NDI)=1, a retransmission(s) of the CG PUSCH transmission(s) based on the second information.

In one example, a base station apparatus that communicates with a user equipment (UE) comprising: transmitting circuitry configured to: transmit a Radio Resource Control (RRC) message including first information indicating a repetition type for configured grant (CG) Physical Uplink Shared Channel (PUSCH) transmission(s), transmit a RRC message including second information indicating a repetition type for grant based (GB) PUSCH transmission(s), receiving circuitry configured to: receive the CG PUSCH transmission(s) based on the first information, receive, based on a transmission of a physical downlink control channel (PDCCH) with Cyclic Redundancy Check (CRC) scrambled by Cell Radio Network Temporary Identifier (C-RNTI), the GB PUSCH transmission(s) based on the second information, receive, based on a transmission of a PDCCH with CRC scrambled by Configured Scheduling Radio Network Temporary Identifier (CS-RNTI) with New Data Indicator (NDI)=1, a retransmission(s) of the CG PUSCH transmission(s) based on the second information.

In one example, a communication method of a user equipment comprising: receiving a Radio Resource Control (RRC) message including first information indicating a repetition type for configured grant (CG) Physical Uplink Shared Channel (PUSCH) transmission(s), receiving a RRC message including second information indicating a repetition type for grant based (GB) PUSCH transmission(s), performing the CG PUSCH transmission(s) based on the first information, performing, based on a detection of a physical downlink control channel (PDCCH) with Cyclic Redundancy Check (CRC) scrambled by Cell Radio Network Temporary Identifier (C-RNTI), the GB PUSCH transmission(s) based on the second information, performing, based on a detection of a PDCCH with CRC scrambled by Configured Scheduling Radio Network Temporary Identifier (CS-RNTI) with New Data Indicator (NDI)=1, a retransmission(s) of the CG PUSCH transmission(s) based on the second information.

In one example, a communication method of a base station apparatus comprising: transmitting a Radio Resource Control (RRC) message including first information indicating a repetition type for configured grant (CG) Physical Uplink Shared Channel (PUSCH) transmission(s), transmitting a RRC message including second information indicating a repetition type for grant based (GB) PUSCH transmission(s), receiving circuitry configured to: receiving the CG PUSCH transmission(s) based on the first information, receiving, based on a transmission of a physical downlink control channel (PDCCH) with Cyclic Redundancy Check (CRC) scrambled by Cell Radio Network Temporary Identifier (C-RNTI), the GB PUSCH transmission(s) based on the second information, receiving, based on a transmission of a PDCCH with CRC scrambled by Configured Scheduling Radio Network Temporary Identifier (CS-RNTI) with New Data Indicator (NDI)=1, a retransmission(s) of the CG PUSCH transmission(s) based on the second information.

DESCRIPTION OF EMBODIMENTS

Figure 1:
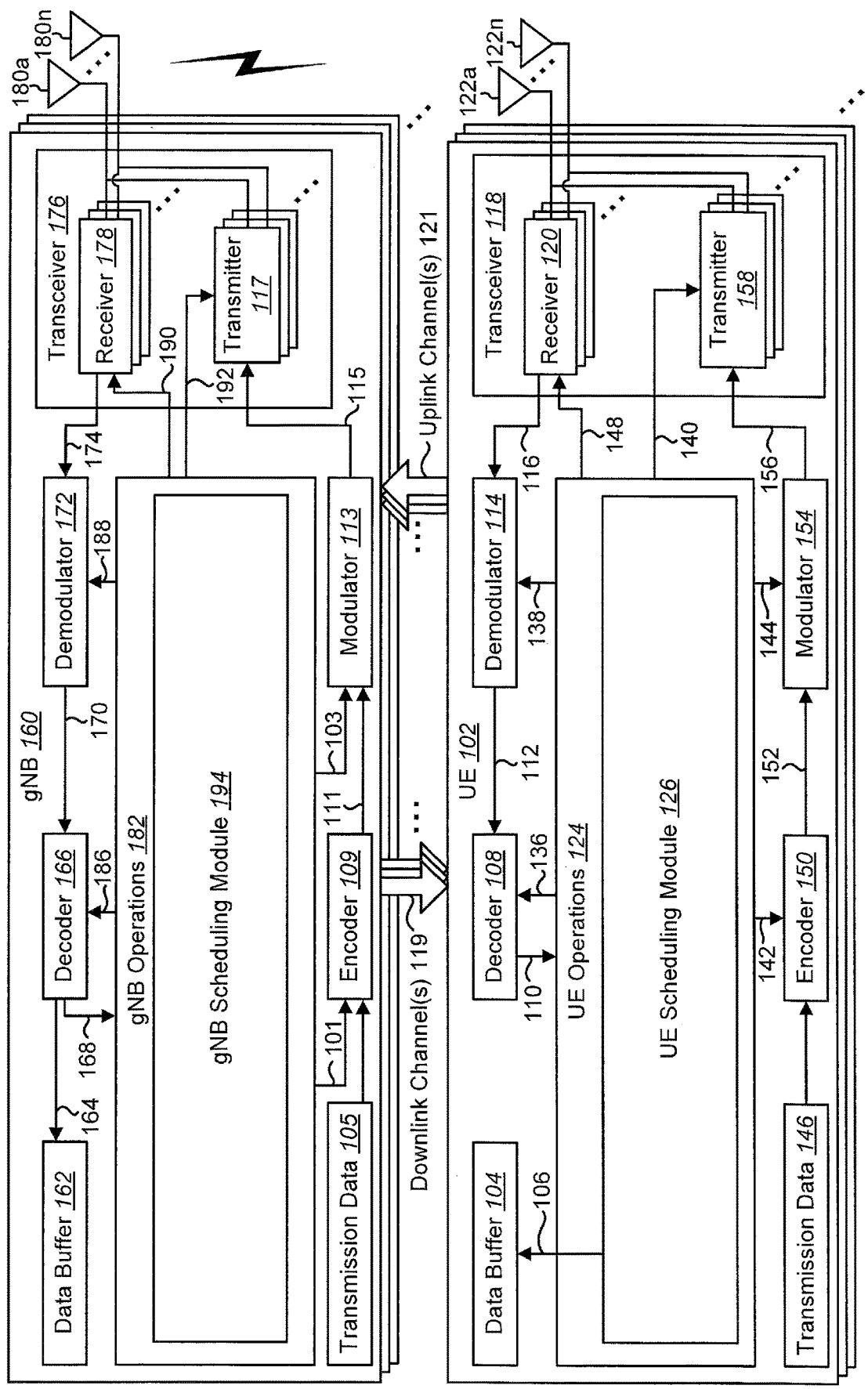
FIG. 1 is a block diagram illustrating one implementation of one or more base stations (gNBs) and one or more user equipments (UEs) for enhanced uplink transmissions.

A user equipment (UE) is described. The UE includes receiving circuitry configured to receive signaling that comprises a configuration for a configured grant physical uplink shared channel (PUSCH) or a grant-based PUSCH. The UE also includes a higher layer processor configured to determine whether to use multi-segment transmissions and mini-slot repetitions for the configured grant PUSCH or grant-based PUSCH. The UE further includes transmitting circuitry configured to transmit the multi-segment transmissions and the mini-slot repetitions for the configured grant PUSCH or grant-based PUSCH.

In an approach, one or more actual PUSCH repetitions in one slot, or two or more actual PUSCH repetitions across slot boundary in consecutive available slots, are supported using one uplink (UL) grant for the grant-based PUSCH and one configured grant configuration for the configured grant PUSCH.

In another approach, one or more PUSCH repetitions in one slot, or two or more PUSCH repetitions across slot boundary in consecutive available slots, are supported using one UL grant for the grant-based PUSCH and one configured grant configuration for the configured grant PUSCH.

A base station (gNB) is also described. The gNB includes transmitting circuitry configured to transmit, to a UE, signaling that comprises a configuration for a configured grant PUSCH or a grant-based PUSCH. The gNB also includes a higher layer processor configured to determine whether to use multi-segment transmissions and mini-slot repetitions for the configured grant PUSCH or the grant-based PUSCH. The gNB further includes receiving circuitry configured to receive, from the UE, the multi-segment transmissions and the mini-slot repetitions for the configured grant PUSCH or the grant-based PUSCH.

A method by a UE is also described. The method includes receiving signaling that comprises a configuration for a configured grant PUSCH or a grant-based PUSCH. The method also includes determining whether to use multi-segment transmissions and mini-slot repetitions for the configured grant PUSCH or then grant-based PUSCH. The method further includes transmitting the multi-segment transmissions and the mini-slot repetitions for the configured grant PUSCH or the grant-based PUSCH.

A method by a gNB is also described. The method includes transmitting, to a UE, signaling that comprises a configuration for a configured grant PUSCH or a grant-based PUSCH. The method also includes determining whether to use multi-segment transmissions and mini-slot repetitions for the configured grant PUSCH or then grant-based PUSCH. The method further includes receiving, from the UE, the multi-segment transmissions and the mini-slot repetitions for the configured grant PUSCH or the grant-based PUSCH.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and/or "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined as "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s). "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

Fifth generation (5G) cellular communications (also referred to as "New Radio," "New Radio Access Technology" or "NR" by 3GPP) envisions the use of time, frequency and/or space resources to allow for enhanced mobile broadband (eMBB) communication and ultra-reliable low-latency communication (URLLC) services, as well as massive machine type communication (MMTC) like services. A new radio (NR) base station may be referred to as a gNB. A gNB may also be more generally referred to as a base station device.

Some configurations of the systems and methods described herein teach approaches for URLLC transmission and/or retransmission management to meet the latency and/or reliability requirement. Some requirements for URLLC relate to user (U)-plane latency and reliability. For URLLC, the target user plane latency is 0.5 milliseconds (ms) each way for both UL and DL. The target reliability is $1-10^{-5}$ for X bytes within 1 milliseconds (ms).

These URLLC-specific constraints make the hybrid automatic repeat request (HARQ) and retransmission mechanism design difficult. For example, the receiver must reply with a quick acknowledgement (ACK) or negative acknowledgement (NACK) or an uplink grant to meet the latency requirement, or the transmitter can retransmit immediately without waiting for ACK/NACK to enhance the reliability. On the other, grant-based or grant-free repetitions are supported to further enhance the reliability. How to terminate the repetitions is also an important issue. The described systems and methods teach URLLC HARQ and/or retransmission design in different cases.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more base stations (gNBs) 160 and one or more user equipments (UEs) 102 for enhanced uplink transmissions. The one or more UEs 102 communicate with one or more gNBs 160 using one or more antennas 122a-n. For example, a UE 102 transmits electromagnetic signals to the gNB 160 and receives electromagnetic signals from the gNB 160 using the one or more antennas 122a-n. The gNB 160 communicates with the UE 102 using one or more antennas 180a-n.

The UE 102 and the gNB 160 may use one or more channels 119, 121 to communicate with each other. For example, a UE 102 may transmit information or data to the gNB 160 using one or more uplink channels 121. Examples of uplink channels 121 include a PUCCH (Physical Uplink Control Channel) and a PUSCH (Physical Uplink Shared Channel), PRACH (Physical Random Access Channel), etc. For example, uplink channels 121 (e.g., PUSCH) may be used for transmitting UL data (i.e., Transport Block(s), MAC PDU, and/or UL-SCH (Uplink-Shared Channel)).

Here, UL data may include URLLC data. The URLLC data may be UL-SCH data. Here, URLLC-PUSCH (i.e., a different Physical Uplink Shared Channel from PUSCH) may be defined for transmitting the URLLC data. For the sake of simple description, the term "PUSCH" may mean any of (1) only PUSCH (e.g., regular PUSCH, non-URLLC-PUSCH, etc.), (2) PUSCH or URLLC-PUSCH, (3) PUSCH and URLLC-PUSCH, or (4) only URLLC-PUSCH (e.g., not regular PUSCH).

Also, for example, uplink channels 121 may be used for transmitting Hybrid Automatic Repeat Request-ACK (HARQ-ACK), Channel State Information (CSI), and/or Scheduling Request (SR). The HARQ-ACK may include information indicating a positive acknowledgment (ACK) or a negative acknowledgment (NACK) for DL data (i.e., Transport Block(s), Medium Access Control Protocol Data Unit (MAC PDU), and/or DL-SCH (Downlink-Shared Channel)).

The CSI may include information indicating a channel quality of downlink. The SR may be used for requesting UL-SCH (Uplink-Shared Channel) resources for new transmission and/or retransmission. Namely, the SR may be used for requesting UL resources for transmitting UL data.

The one or more gNBs 160 may also transmit information or data to the one or more UEs 102 using one or more downlink channels 119, for instance. Examples of downlink channels 119 include a PDCCH, a PDSCH, etc. Other kinds of channels may be used. The PDCCH may be used for transmitting Downlink Control Information (DCI).

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the gNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may comprise received payload data, which may be stored in a data buffer 104. Another signal included in the decoded signals 110 (also referred to as a second UE-decoded signal 110) may comprise overhead data and/or control data. For example, the second UE-decoded signal 110 may provide data that may be used by the UE operations module 124 to perform one or more operations.

In general, the UE operations module 124 may enable the UE 102 to communicate with the one or more gNBs 160. The UE operations module 124 may include a UE scheduling module 126.

The UE scheduling module 126 may perform operations for mini-slot-based repetitions. In new radio (NR), a UE 102 may support multiple types of UL transmissions (PUSCH transmissions). The UL transmissions may include grant-based UL transmissions (e.g., UL transmissions with grant, dynamic grants, PUSCH transmissions with grant, PUSCH transmission scheduled by DCI (e.g., DCI format 0_0, DCI format 0_1)) and grant-free UL transmissions (e.g., UL transmissions without grant, configured grants, PUSCH transmissions with configured grant).

There may be two types of grant-free UL transmissions (e.g., UL transmissions without grant, with configured grants, PUSCH transmissions with configured grant). One type of grant-free UL transmission is a configured grant Type 1 and the other is configured grant Type 2.

For Type 1 PUSCH transmissions with a configured grant, related parameters may be fully RRC-configured (e.g., configured by using RRC signaling). For example, parameters for resource allocation, such as time domain resource allocation (e.g., time-DomainOffset, timeDomainAllocation), frequency domain resource allocation (frequencyDomain-Allocation), modulation and coding scheme (MCS) (e.g., mcsAndTBS), the antenna port value, the bit value for DMRS sequence initialization, precoding information and number of layers, SRS resource indicator (provided by antennaPort, dmrs-SeqInitialization, precodingAndNumberOfLayers, and srs-ResourceIndicator respectively), the frequency offset between two frequency hops (frequencyHoppingOffset), etc., may be provided by RRC message (rrc-ConfiguredUplinkGrant).

Activation (e.g., PDCCH, DCI activation) may not be used for Type 1 configured grant. Namely, for configured grant Type 1, an uplink grant is provided by RRC, and stored as configured uplink grant. The retransmission of configured grant type 1 may be scheduled by PDCCH with CRC scrambled by CS-RNTI (Configured Scheduling RNTI).

For Type 2 PUSCH transmissions with a configured grant, the related parameters follow the higher layer configuration (e.g., periodicity, the number of repetitions, etc.), and UL grant received on the DCI addressed to CS-RNTI (PDCCH with CRC scrambled by CS-RNTI, L1 activation and/or reactivation). Namely, for configured grant Type 2, an uplink grant may be provided by PDCCH, and stored or cleared as a configured uplink grant based on L1 signaling indicating configured uplink grant activation or deactivation.

The retransmission of configured grant type 2 may be scheduled by PDCCH with CRC scrambled by CS-RNTI (e.g., with NDI=1). Namely, retransmissions except for repetition of configured uplink grants may use uplink grants addressed to CS-RNTI. The UE 102 may not transmit anything on the resources configured for PUSCH transmissions with configured grant if the higher layers did not deliver a transport block to transmit on the resources allocated for uplink transmission without grant.

Therefore, in NR, a UE 102 may support multiple types of uplink transmissions without grant (also referred to as grant-free (GF) uplink transmission or GF transmission or transmission by configured grant). A first type (Type 1) of GF transmission may be a UL data transmission without grant that is only based on RRC (re)configuration without any L1 signaling. In a second type (Type 2) of GF transmission, UL data transmission without grant is based on both RRC configuration and L1 signaling for activation and/or deactivation for UL data transmission without grant. An example for RRC configuration is shown in Listing 1.

Listing 1

```
-- ASN1START
-- TAG-CONFIGUREDGRANTCONFIG-START
ConfiguredGrantConfig ::=        SEQUENCE {
    frequencyHopping                 ENUMERATED {mode1, mode2}
                                         OPTIONAL,     -- Need S,
    cg-DMRS-Configuration            DMRS-UplinkConfig,
    mcs-Table                        ENUMERATED {qam256, spare1}
                                         OPTIONAL,     -- Need S
    mcs-TableTransformPrecoder       ENUMERATED {qam256, spare1}
                                         OPTIONAL,     -- Need S
    uci-OnPUSCH                      SetupRelease {
                                         CG-UCI-OnPUSCH },
    resourceAllocation               ENUMERATED {
                                         resourceAllocationType0,
                                         resourceAllocationType1,
                                         dynamicSwitch },
    rbg-Size                         ENUMERATED {config2}
                                         OPTIONAL,     -- Need S
    powerControlLoopToUse            ENUMERATED {n0, n1},
    p0-PUSCH-Alpha                   P0-PUSCH-AlphaSetId,
    transformPrecoder                ENUMERATED {enabled}
    nrofHARQ-Processes               INTEGER(1..16),
    repK                             ENUMERATED {n1, n2, n4, n8},
    repK-RV                          ENUMERATED {s1-0231,
```

Listing 1

```
                                                   S2-0303,
                                                   S3-0000}
                                        OPTIONAL,      -- Cond RepK
    periodicity                         ENUMERATED {
                                            sym2, sym7, sym1x14,
                                            sym2x14, sym4x14,
                                            sym5x14, sym8x14,
                                            sym10x14, sym16x14,
                                            sym20x14, sym32x14,
                                            sym40x14, sym64x14,
                                            sym80x14, sym128x14,
                                            sym160x14, sym256x14,
                                            sym320x14, sym512x14,
                                            sym640x14, sym1024x14,
                                            sym1280x14, sym2560x14,
                                            sym5120x14, sym6,
                                            sym1x12, sym2x12,
                                            sym4x12, sym5x12,
                                            sym8x12, sym10x12,
                                            sym16x12, sym20x12,
                                            sym32x12, sym40x12,
                                            sym64x12, sym80x12,
                                            sym128x12, sym160x12,
                                            sym256x12, sym320x12,
                                            sym512x12, sym640x12,
                                            sym1280x12, sym2560x12
                                        },
    configuredGrantTimer                INTEGER (1..64)
                                            OPTIONAL,  -- Need R
    rrc-ConfiguredUplinkGrant           SEQUENCE {
        timeDomainOffset                    INTEGER (0..5119),
        timeDomainAllocation                INTEGER (0..15),
        frequencyDomainAllocation           BIT STRING (SIZE(18)),
        antennaPort                         INTEGER (0..31),
        dmrs-SeqInitialization              INTEGER (0..1)
                        OPTIONAL,   -- Cond NoTransformPrecoder
        precodingAndNumberOfLayers          INTEGER (0..63),
        srs-ResourceIndicator               INTEGER (0..15),
        mcsAndTBS                           INTEGER (0..31),
        frequencyHoppingOffset              INTEGER (1..
                    maxNrofPhysicalResourceBlocks-1)
                        OPTIONAL,     -- Need M
        pathlossReferenceIndex              INTEGER (0..
                        maxNrofPUSCH-PathlossReferenceRSs-1),
        ...
    }
        OPTIONAL   -- Need R
}
CG-UCI-OnPUSCH ::= CHOICE {
    dynamic            SEQUENCE (SIZE (1..4)) OF BetaOffsets,
    semiStatic         BetaOffsets
}
-- TAG-CONFIGUREDGRANTCONFIG-STOP
-- ASN1STOP
```

For Type 2, PDCCH activation is needed. Listing 2 and Listing 3 show examples of DCI format 0_0 (e.g., fallback DCI) and format 0_1, which may be used for activation of a Type 2 configured grant, and/or retransmission of Type 2 configured grant and/or Type 1 configured grant.

Listing 2

- Identifier for DCI formats - [1] bit
- Frequency domain resource assignment
- Time domain resource assignment - X bits as defined in Subclause 6.1.2.1 of [6, TS38.214]
- Frequency hopping flag - 1 bit.
- Modulation and coding scheme - 5 bits as defined in Subclause 6.1.3 of [6, TS38.214]
- New data indicator - 1 bit
- Redundancy version - 2 bits as defined in Table 7.3.1.1.1-2
- HARQ process number - 4 bits

Listing 2

- TPC command for scheduled PUSCH - [2] bits as defined in Subclause x.x of [5, TS38.213]
- UL/SUL indicator - 1 bit for UEs configured with SUL in the cell as defined in Table 7.3.1.1.1-1 and the number of bits for DCI format 1_0 before padding is larger than the number of bits for DCI format 0_0 before padding; 0 bit otherwise.

Listing 3

- Carrier indicator - 0 or 3 bits, as defined in Subclause x.x of [5, TS38.213].
- UL/SUL indicator - 0 bit for UEs not configured with SUL in the cell or UEs configured with SUL in the cell but only PUCCH carrier in the cell is configured for PUSCH transmission; 1 bit for UEs configured with SUL in the cell as defined in Table 7.3.1.1.1-1 [TS38.212].
- Identifier for DCI formats - [1] bit
- Bandwidth part indicator - 0, 1 or 2 bits as defined in Table 7.3.1.1.2-1 [TS38.212]. The bitwidth for this field is determined according to the higher layer parameter BandwidthPart-Config for the PUSCH.
- Frequency domain resource assignment
- Time domain resource assignment - 0, 1, 2, 3, or 4 bits as defined in Subclause 6.1.2.1 of [6, TS38.214]. The bitwidth for this field is determined as $\lceil \log_2(I) \rceil$ bits, where I the number of rows in the higher layer parameter [pusch-symbolAllocation].
- VRB-to-PRB mapping - 0 or 1 bit
- Frequency hopping flag - 0 or 1 bit
- New data indicator - 1 bit
- Redundancy version - 2 bits as defined in Table 7.3.1.1.1-2
- HARQ process number - 4 bits
- $1^{st}$ downlink assignment index - 1 or 2 bits
- $2^{nd}$ downlink assignment index - 0 or 2 bits
- TPC command for scheduled PUSCH - 2 bits as defined in Subclause 7.1.1 of [5, TS38.213]
- SRS resource indicator
- Precoding information and number of layers - number of bits determined by the following:
- Antenna ports - number of bits determined by the following
- SRS request - 2 bits as defined by Table 7.3.1.1.2-24 for UEs not configured with SUL in the cell; 3 bits for UEs configured SUL in the cell where the first bit is the non-SUL/SUL indicator as defined in Table 7.3.1.1.1-1 and the second and third bits are defined by Table 7.3.1.1.2-24.
- CSI request - 0, 1, 2, 3, 4, 5, or 6 bits determined by higher layer parameter ReportTriggerSize.
- CBG transmission information (CBGTI) - 0, 2, 4, 6, or 8 bits determined by higher layer parameter maxCodeBlockGroupsPerTransportBlock for PUSCH.
- PTRS-DMRS association - number of bits determined as follows
- beta_offset indicator - 0 if the higher layer parameter dynamic in uci-on-PUSCH is not configured; otherwise 2 bits as defined by Table 7.3.1.1.2-27.
- DMRS sequence initialization - 0 if the higher layer parameter PUSCH-tp=Enabled or 1 bit if the higher layer parameter PUSCH-tp=Disabled for $n_{SCID}$ selection defined in Subclause 7.4.1.1.1 of [4, TS38.211].

For both Type 1 and Type 2 PUSCH transmissions with a configured grant, when the UL 102 is configured with repK>1, the UL 102 may repeat the TB across the repK consecutive slots applying the same symbol allocation in each slot. The parameter repK may be referred as the configured number of transmission occasions for repetitions (including initial transmission) for a TB. If the UL procedure for determining slot configuration determines symbols of a slot allocated for PUSCH as downlink symbols, the transmission on that slot may be omitted for multi-slot PUSCH transmission.

For grant-based transmission, PUSCH transmission is scheduled by DCI (e.g., the DCI format 0_0 and the DCI format 0_1 shown above). The PUSCH may be assigned (e.g., scheduled) by a DCI format 0_0/0_1 with CRC scrambled by C-RNTI, a new-RNTI (e.g., a first RNTI), TC-RNTI, or SP-CSI-RNTI. The new-RNTI may be called as MCS-C-RNTI in specifications. Some UE-specific PUSCH parameters may be configured by RRC (i.e., using the RRC message (the RRC signaling)). An example for RRC configuration is shown in Listing 4. For example, pusch-AggregationFactor in PUSCH-Config indicates number of repetitions for data. When the UE 102 is configured with pusch-AggregationFactor >1, the same symbol allocation may be applied across the pusch-AggregationFactor consecutive slots and the PUSCH may be limited to a single transmission layer. The UE 102 may repeat the transport block (TB) across the pusch-AggregationFactor consecutive slots applying the same symbol allocation in each slot. If the UE procedure for determining the slot configuration, determines symbols of a slot allocated for PUSCH as downlink symbols, the transmission on that slot may be omitted for multi-slot PUSCH transmission.

For the PUSCH retransmission scheduled by a PDCCH with CRC scrambled by CS-RNTI with NDI=1, the parameters in pusch-Config may be applied for the PUSCH transmission except for p0-NominalWithoutGrant, p0-PUSCH-Alpha, powerControl-LoopToUse, pathlossReferenceIndex, mcs-Table, mcs-TableTransformPrecoder and transformPrecoder, which may be provided in configuredGrantConfig.

For the PUSCH retransmission scheduled by a PDCCH with CRC scrambled by CS-RNTI with new data indicator (NDI) equal to 1 (i.e., NDI=1), if the UE 102 is configured with pusch-AggregationFactor, the same symbol allocation may be applied across the pusch-AggregationFactor consecutive slots and the PUSCH may be limited to a single transmission layer. The UE 102 may repeat the TB across the pusch-AggregationFactor consecutive slots applying the same symbol allocation in each slot.

Listing 4

```
-- ASN1START
-- TAG-PUSCH-CONFIG-START
PUSCH-Config ::=                        SEQUENCE {
    dataScramblingIdentityPUSCH             INTEGER (0..1023)
                                                OPTIONAL,   -- Need M
    txConfig                                ENUMERATED {codebook,
                                                    nonCodebook}
                                                OPTIONAL,   -- Need S
    dmrs-UplinkForPUSCH-MappingTypeA        SetupRelease {
                                                DMRS-UplinkConfig }
                                                OPTIONAL,   -- Need M
    dmrs-UplinkForPUSCH-MappingTypeB        SetupRelease {
                                                DMRS-UplinkConfig }
                                                OPTIONAL,   -- Need M
    pusch-PowerControl                      PUSCH-PowerControl
                                                OPTIONAL, -- Need M
    frequencyHopping                        ENUMERATED {mode1, mode2}
                                                OPTIONAL,   -- Need S
    frequencyHoppingOffsetLists             SEQUENCE (SIZE (1..4)) OF
        INTEGER (1..maxNrofPhysicalResourceBlocks-1)
                                                OPTIONAL,   -- Need M
    resourceAllocation                      ENUMERATED {
                                            resourceAllocationType0,
                                            resourceAllocationType1,
                                            dynamicSwitch},
    pusch-TimeDomainAllocationList          SetupRelease {
            PUSCH-TimeDomainResourceAllocationList }
                                                OPTIONAL,   -- Need M
    pusch-AggregationFactor                 ENUMERATED { n2, n4, n8 }
                                                OPTIONAL,   -- Need S
    mcs-Table                               ENUMERATED {qam256,
                                                    spare1}
                                                OPTIONAL,   -- Need S
    mcs-TableTransformPrecoder              ENUMERATED {qam256,
                                                    spare1}
                                                OPTIONAL,   -- Need S
    transformPrecoder                       ENUMERATED {enabled,
                                                    disabled}
                                                OPTIONAL,   -- Need S
    codebookSubset                          ENUMERATED {
                                            fullyAndPartialAndNonCoherent,
                                            partialAndNonCoherent,
                                            noncoherent}
                                        OPTIONAL,        -- Cond codebookBased
    maxRank                                 INTEGER (1..4)
                                        OPTIONAL,        -- Cond codebookBased
    rbg-Size                                ENUMERATED { config2 }
                                                OPTIONAL,   -- Need S
    uci-OnPUSCH                             SetupRelease {
                                                    UCI-OnPUSCH}
                                                OPTIONAL, -- Need M
    tp-pi2BPSK                              ENUMERATED {enabled}
                                                OPTIONAL,   -- Need S
    ...
}
UCI-OnPUSCH ::=                         SEQUENCE {
    betaOffsets                             CHOICE {
        dynamic                                 SEQUENCE (SIZE (4)) OF
                                                    BetaOffsets,
        semiStatic                              BetaOffsets
    }
                                                OPTIONAL, -- Need M
    scaling                                 ENUMERATED { f0p5, f0p65,
                                                    f0p8, f1 }
}
-- TAG-PUSCH-CONFIG-STOP
-- ASN1STOP
```

As mentioned above, for both grant-free transmission and grant-based transmission, if repetitions are configured to the UE 102, for repetitions, consecutive slots and the same time-domain resource allocation (e.g., starting symbol and/or length) may be applied to each slot, which may be referred as slot-based repetitions herein. In another design, two or more PUSCH repetitions may be scheduled and/or configured in one slot, or across a slot boundary in consecutive available slots. In yet another design, two or more PUSCH repetitions in consecutive available slots may be with one repetition in each slot with possibly different starting symbols and/or durations. The two or more PUSCH repetitions in one slot, or across a slot boundary in consecutive available slots, and/or two or more PUSCH repetitions in consecutive available slot (with possibly different starting symbols and/or durations) may be referred as mini-slot based repetitions.

Namely, for the slot-based repetitions, only one transmission occasion may be scheduled (e.g., allocated) within a slot (e.g., 14 OFDM symbols and/or 14 SC-FDMA symbols). Here, one transmission occasion may be corresponding to the PUSCH resources to be applied for the PUSCH transmission. And, the PUSCH resources (e.g., the one transmission occasion) may be identified (e.g., indicated, defined) by using the time-domain resource allocation. For example, the PUSCH resources (e.g., the one transmission occasion) may be identified by using the starting symbol and/or the length (i.e., the starting symbols and/or the length of the PUSCH resources). For example, for the slot-based repetitions, the same one transmission occasion may be used in the slot, wherein the same one transmission occasion may be applied for each consecutive slot.

Additionally or alternatively, for the mini-slot based repetitions, two or more transmission occasions may be scheduled (e.g., allocated) within a slot. Here, each transmission occasion may be corresponding to the PUSCH resources to be applied for the PUSCH transmission. For example, two or more time-domain resource allocations (two or more values of the starting symbols and/or two or more values of the length) are used for scheduling of the PUSCH resources (e.g., the transmission occasions) in the slot. And, each PUSCH resource (e.g., each transmission occasion) may be identified by using each time-domain resource allocation. For example, the PUSCH resources (e.g., each transmission occasion) may be identified by using each value of the starting symbol and/or each value of the length. For example, for the mini-slot based repetitions, the two or more transmission occasions may be used in the slot, wherein each of the two or more transmission occasions may be identified by using each starting symbol and/or each length. Namely, different starting symbol(s) and/or different length(s) may be applied for the two or more transmission occasions in the slot.

Additionally or alternatively, for the mini-slot based repetitions, each transmission occasion identified by using each starting symbol and/or each length may be applied for each slot (e.g., each consecutive slot). Namely, different starting symbol(s) and/or different length(s) may be applied for two or more transmission occasions in two or more slot.

In an example, if the UE 102 is configured by RRC, or indicated by L1/L2 signaling, that two or more PUSCH repetitions are allowed to perform in one slot, after one of repetitions (including initial transmission) for a TB is finished in a slot, the immediately next repetition may use the remaining available symbols in the slot. Namely, in the slot, the transmission occasion(s) (e.g., the remaining available symbol(s)) may be used for the repetitions (e.g., the next repetition in the slot). As described above, the available symbols (e.g., the transmission occasion) may be defined as L_r consecutive uplink symbols (i.e., consecutive symbols) started from symbol S_r (i.e., starting symbols), where symbol S_r may be defined as the first uplink symbol (or the first uplink symbol of first L_r consecutive uplink symbols in the slot) and L_r is defined as the length of the repetition or initial transmission (e.g., symbol(s)). For example, for a second transmission of the repetitions in a slot, the symbols S_r may be defined as the first uplink symbol after a first transmission of the repetitions in the slot is performed (or the first uplink symbol of first L_r consecutive uplink symbols after a first transmission of the repetitions in the slot is performed, or a predefined start position, e.g., symbol #7, symbol #2, symbol #4, symbol #8, symbol #10). If there are no L_r consecutive uplink symbols in the slot (e.g., after the first transmission of the repetitions in the slot is performed) according to the UE procedure for determining slot configuration, the immediately next repetition (e.g., the second transmission of the repetitions in the slot) may be skipped in the slot (e.g., dropped in the slot, not performed in the slot) or the immediately next repetition in the slot may be omitted (e.g., omitted in the slot).

Namely, the gNB 160 may configure, by using the RRC message, information used for configuring that the mini-slot based repetitions are performed. And, in a case that the mini-slot based repetitions are performed, if there is no transmission occasion for a transmission in the slot, the UE 102 may skip (e.g., drop, not perform, and/or omit) the transmission. Here, as described above, the transmission occasion (e.g., each transmission occasion in the slot) may be identified (e.g., indicated by the gNB 160 using the DCI format 0_0 and/or 0_1) by using the time domain resource allocation (e.g., each time domain resource allocation (e.g., each starting symbol and/or each length)). Namely, the UE 102 may perform, in the slot, the transmission of the repetitions (e.g., the first transmission of the repetitions, the transmission in the repetitions) on the transmission occasion (i.e., if the transmission occasion is identified by using the time domain resource allocation). Also, the UE 102 may skip, in the slot, the transmission of the repetitions (e.g., the second transmission of the repetitions, the transmission in the repetitions) if there are no transmission occasion (i.e., if there are no transmission occasion identified based on the time domain resource allocation).

In yet another design, the available symbols (e.g., transmission occasion) may be defined as L_r consecutive symbols (uplink symbols and/or flexible symbols) started from symbol S_r, where symbol S_r is the first symbol (uplink symbol and/or flexible symbol) after the repetition in the slot (or the first symbol (uplink symbols and/or flexible symbols) of first L_r consecutive symbols (uplink symbols and/or flexible symbols) after the repetition in the slot, or a predefined start position, e.g., symbol #7, symbol #2, symbol #4, symbol #8, symbol #10) and L_r is the length of the repetition or initial transmission. If there are no L_r consecutive symbols (uplink symbols and/or flexible symbols) in the slot after the repetition according to the UE procedure for determining slot configuration, the immediately next repetition may skip the slot or the immediately next repetition in the slot may be omitted. Namely, L_r consecutive symbols may include uplink symbols and/or flexible symbols.

In yet another example, if the UE 102 is configured by RRC, or indicated by L1/L2 signaling, that two or more PUSCH repetitions are allowed to perform in one slot and different repetitions may use different lengths (numbers of symbols), after one of repetitions (including initial transmission) for a TB is finished in a slot, the immediately next repetition may use the remaining available symbols in the slot. The available symbols (e.g., transmission occasion) may be defined as L_rd consecutive uplink symbols started from symbol S_rd, where symbol S_rd is the first uplink symbol after the repetition in the slot (or the first uplink symbol of first L_rd consecutive uplink symbols after the repetition in the slot, or a predefined start position, e.g., symbol #7, symbol #2, symbol #4, symbol #8, symbol #10) and L_rd may be a different length compared to the length of the repetition or initial transmission (i.e., L_r). L_rd may be configured by RRC or indicated by L1/L2 signaling or fixed by specification. L_rd may be determined by L_r (e.g., L_rd=L_r−L_delta and L_delta may be a pre-defined or indicated or configured value (e.g., 1, 2, −1, −2, 0)). L_rd may be determined by the slot configuration (e.g., L_rd is the number of remaining consecutive uplink symbols in the slot). If there are no L_rd consecutive uplink symbols in the slot after the repetition according to the UE procedure for determining slot configuration, the immediately next repetition may skip the slot or the immediately next repetition in the slot may be omitted.

In yet another design, the available symbols (e.g., transmission occasion) may be defined as L_rd consecutive symbols (uplink symbols and/or flexible symbols) started from symbol S_rd, where symbol S_rd is the first symbol (uplink symbol and/or flexible symbol) after the repetition in the slot (or the first symbol (uplink symbols and/or flexible symbols) of first L_rd consecutive symbols (uplink symbols and/or flexible symbols) after the repetition in the slot, or a predefined start position, e.g., symbol #7, symbol #2, symbol #4, symbol #8, symbol #10) and L_rd may be a different length compared to the length of the repetition or initial transmission (i.e., L_r). L_rd may be configured by RRC or indicated by L1/L2 signaling or fixed by specification. L_rd may be determined by L_r (e.g., L_rd=L_r−L_delta and L_delta may be a pre-defined or indicated or configured value (e.g, 1, 2, −1, −2, 0)). L_rd may be determined by the slot configuration (e.g., L_rd may be the number of remaining consecutive uplink symbols and/or flexible symbols in the slot). If there are no L_rd consecutive symbols (uplink symbols and/or flexible symbols) in the slot after the repetition according to the UE procedure for determining slot configuration, the immediately next repetition may skip the slot or the immediately next repetition in the slot may be omitted.

When the UE 102 is configured by RRC, or indicated by L1/L2 signaling, that two or more PUSCH repetitions are allowed to perform in one slot, the two or more PUSCH repetitions may or may not share a demodulation reference signal (DMRS (e.g., DMRS associated with the PUSCH transmission)). Whether the two or more PUSCH repetitions share DMRS or not may be configured by RRC, or indicated by L1/L2 signaling. For example, if the UE 102 is configured by RRC, or indicated by L1/L2 signaling, that two or more PUSCH repetitions are allowed to perform in one slot and two or more PUSCH repetitions may share DMRS, the DMRS of the first repetition in the slot may be reused by the following repetition(s) in the slot. Namely, the gNB 160 may transmit, by using the RRC message and/or the DCI format(s) (e.g., the DCI format 0_0 and/or 0_1), information used for indicating that whether the DMRS(s) associated with the PUSCH transmission is shared for the repetitions or not in the slot (and/or across the slots).

For repetitions in consecutive slots, the same start symbol may or may not be applied in each slot. Namely, after one or more repetitions of a TB in a slot is finished, the repetition in the next slot may start at a symbol, which may be different from the start symbol of repetition(s) in previous slot(s), the start symbol of initial transmission, the start symbol indicated by PDCCH (e.g., Type 2 configured grant activation), or the start symbol configured by RRC (e.g., Type 1 configured grant configuration).

In an example, if the UE 102 is configured by RRC, or indicated by L1/L2 signaling, that PUSCH repetition(s) in consecutive slot(s) are allowed to start at a different symbol and the length of repetition(s) should keep the same, after one or more of repetitions (including initial transmission) for a TB is finished in a slot, the next repetition in the consecutive slot may start at symbol S_d in the consecutive slot. The start symbol S_d may be defined as the first uplink symbol in the consecutive slot according to the UE procedure for determining slot configuration or the first symbol of available symbols for the repetition in the consecutive slot (or the first symbol of first L_r consecutive uplink symbols in the consecutive slot, or a predefined start position, e.g., symbol #7, symbol #2, symbol #4, symbol #8, symbol #10, or an indicated start position by RRC or L1/L2 signaling). The available symbols (e.g., transmission occasion) for the repetition in the consecutive slot may be defined as L_r consecutive uplink in the consecutive slot, where L_r is the length of the repetition in the previous slot or initial transmission or the length configured by RRC (e.g., Type 1 configured grant configuration) or indicated by PDCCH (e.g., Type 2 configured grant activation). If there are no L_r consecutive uplink symbols in the consecutive slot after the repetition according to the UE procedure for determining slot configuration, the next repetition in the consecutive slot may skip the slot or the next repetition in the consecutive slot may be omitted.

In yet another design, the start symbol S_d may be defined as the first uplink and/or flexible symbol in the consecutive slot according to the UE procedure for determining slot configuration or the first symbol of available symbols for the repetition in the consecutive slot (or the first symbol of first L_r consecutive symbols (uplink symbols and/or flexible symbols) in the consecutive slot, or a predefined start position, e.g., symbol #7, symbol #2, symbol #4, symbol #8, symbol #10, or an indicated start position by RRC or L1/L2 signaling). The available symbols (e.g., transmission occasion) in the consecutive slot may be defined as L_r consecutive symbols (uplink symbols and/or flexible symbols) in the consecutive slot, where L_r the length of the repetition in the previous slot or initial transmission or the length configured by RRC (e.g., Type 1 configured grant configuration) or indicated by PDCCH (e.g., Type 2 configured grant activation). If there are no L_r consecutive symbols (uplink symbols and/or flexible symbols) in the consecutive slot according to the UE procedure for determining slot configuration, the next repetition in the consecutive slot may skip the slot or the next repetition in the consecutive slot may be omitted.

In yet another example, if the UE 102 is configured by RRC, or indicated by L1/L2 signaling, that PUSCH repetition(s) in consecutive slot(s) are allowed to start at a different symbol and the length of repetition(s) can be different, after one or more of repetitions (including initial transmission) for a TB is finished in a slot, the next repetition in the consecutive slot may start at symbol S_d in the consecutive slot. The start symbol S_d may be defined as the first uplink symbol in the consecutive slot according to the UE procedure for determining slot configuration or the first symbol of available symbols for the repetition in the consecutive slot (or the first symbol of first L_rd consecutive uplink symbols in the consecutive slot, or a predefined start position, e.g., symbol #7, symbol #2, symbol #4, symbol #8, symbol #10, or an indicated start position by RRC or L1/L2 signaling). The available symbols (e.g., transmission occasion) for the repetition in the consecutive slot may be defined as L_rd consecutive uplink in the consecutive slot, where L_rd may be a different length compared to the length of the repetition in a previous slot or initial transmission or the length configured by RRC (e.g., Type 1 configured grant configuration) or indicated by PDCCH (e.g., Type 2 configured grant activation), which is denoted by L_r. L_rd may be configured by RRC or indicated by L1/L2 signaling or fixed by specification. L_rd may be determined by L_r (e.g., L_rd=L_r−L_delta and L_delta may be a pre-defined or indicated or configured value (e.g, 1, 2, −1, −2, 0)). L_rd may be determined by the slot configuration (e.g., L_rd is the number of consecutive uplink symbols in the consecutive slot, or the maximum number of consecutive uplink symbols in the consecutive slot). If there are no L_rd consecutive uplink symbols in the consecutive slot according to the UE procedure for determining slot configuration, the next repetition in the consecutive slot may skip the slot or the next repetition in the consecutive slot may be omitted.

In yet another design, the start symbol S_d may be defined as the first uplink and/or flexible symbol in the consecutive slot according to the UE procedure for determining slot configuration or the first symbol of available symbols for the repetition in the consecutive slot (or the first symbol of first L_rd consecutive symbols (uplink symbols and/or flexible symbols) in the consecutive slot, or a predefined start position, e.g., symbol #7, symbol #2, symbol #4, symbol #8, symbol #10, or an indicated start position by RRC or L1/L2 signaling). The available symbols (e.g., transmission occasion) in the consecutive slot may be defined as L_rd consecutive symbols (uplink symbols and/or flexible symbols) in the consecutive slot, where L_rd may be a different length compared to the length of the repetition in the previous slot or initial transmission or the length configured by RRC (e.g., Type 1 configured grant configuration) or indicated by PDCCH (e.g., Type 2 configured grant activation), which is denoted by L_r. L_rd may be configured by RRC or indicated by L1/L2 signaling or fixed by specification. L_rd may be determined by L_r, e.g., L_rd=L_r−L_delta and L_delta may be a pre-defined or indicated or configured value (e.g, 1, 2, −1, −2, 0). L_rd may be determined by the slot configuration (e.g., L_rd is the number of consecutive uplink and/or flexible symbols in the consecutive slot, or the maximum number of consecutive uplink and/or flexible symbols in the consecutive slot). If there are no L_rd consecutive symbols (uplink symbols and/or flexible symbols) in the consecutive slot according to the UE procedure for determining slot configuration, the next repetition in the consecutive slot may skip the slot or the next repetition in the consecutive slot may be omitted.

PUSCH preparation time N_2 [symbols] may be defined as the minimum time for the UE 102 to prepare PUSCH for a TB. N_2 may be determined by numerology and/or UE capability. N_2 may be defined in the specification and/or configured by RRC and/or indicated by L1/L2 signaling. PUSCH preparation time for a repetition which is not an initial transmission may or may not be same as the PUSCH preparation time for the initial transmission. The PUSCH preparation time for a repetition which is not an initial transmission may be denoted by N_2r. N_2r may be determined by numerology and/or UE capability. N_2r may be defined in the specification and/or configured by RRC and/or indicated by L1/L2 signaling.

If a UE 102 is configured by higher layers to transmit PUSCH repetition (which may not be an initial transmission) in a set of symbols of a slot as mentioned above and the UE 102 detects a DCI format 1_0, DCI format 1_1, or DCI format 0_1 indicating to the UE 102 to receive CSI-RS or PDSCH in a subset of symbols from the set of symbols, then the UE 102 does not expect to cancel the transmission in symbols from the subset of symbols that occur, relative to a last symbol of a control resource set where the UE 102 detects the DCI format 1_0 or the DCI format 1_1 or the DCI format 0_1, after a number of symbols that is smaller than the PUSCH preparation time for the repetition as mentioned above, or the UE 102 cancels the PUSCH repetition in remaining symbols from the set of symbols.

If a UE 102 is scheduled by a DCI to transmit PUSCH over multiple slots and different start symbols and/or lengths may be applied for each repetition as mentioned above, and if a higher layer parameter, when provided to the UE 102, indicates that, for a slot from the multiple slots, at least one symbol from a set of symbols where the UE 102 is scheduled PUSCH transmission in the slot is a downlink symbol, the UE 102 does not transmit the PUSCH in the slot.

A slot format includes downlink symbols, uplink symbols, and flexible symbols. The slot format may be indicated by RRC message (e.g., TDD-UL-DL-ConfigurationCommon and TDD-UL-DL-ConfigDedicated) and/or dynamic signaling (e.g., slot format indicator (SFI), dynamic SFI, DCI format 2_0, information included in the DCI format 2_0). Downlink symbol(s), uplink symbol(s), and flexible symbol(s) configured by using the RRC message may be named as semi-static UL symbol(s), semi-static DL symbol(s), semi-static flexible symbol(s), respectively. Namely, the gNB 160 may transmit, by using the RRC message, information used for configuring the semi-static UL symbol(s), the semi-static DL symbol(s), and/or the semi-static flexible symbol(s). The UE 102 may determine the semi-static UL symbol(s), the semi-static DL symbol(s), and/or the semi-static flexible symbol(s) based on the information included in the RRC message. Downlink symbol(s), uplink symbol(s), and flexible symbol(s) indicated by using the dynamic signaling may be named as dynamic UL symbol(s), dynamic DL symbol(s), dynamic flexible symbol(s), respectively. Namely, the gNB 160 may transmit, by using the dynamic signaling, information used for indicating the dynamic UL symbol(s), the dynamic DL symbol(s), and/or dynamic flexible symbol(s). The UE 102 may determine the dynamic UL symbol(s), the dynamic DL symbol(s), and/or the dynamic flexible symbol(s) based on the information included in the dynamic signaling.

For a set of symbols of a slot indicated to a UE 102 as flexible by higher layer parameters (e.g., TDD-UL-DL-ConfigurationCommon and TDD-UL-DL-ConfigDedicated), when provided to the UE 102, or when higher layer parameters (e.g., TDD-UL-DL-ConfigurationCommon and TDD-UL-DL-ConfigDedicated) are not provided to the UE 102, and if the UE 102 detects a DCI format 2_0 providing a format for the slot using a slot format value (e.g., other than 255), if the UE 102 is configured by higher layers to transmit PUSCH repetition in the set of symbols of the slot as mentioned above, then the UE 102 may transmit the PUSCH repetition in the slot only if an SFI-index field value in DCI format 2_0 indicates the set of symbols of the slot as uplink.

The UE 102 may not expect to detect an SFI-index field value in DCI format 2_0 indicating the set of symbols of the slot as downlink or flexible if the set of symbols of the slot includes symbols corresponding to any repetition of a PUSCH transmission as mentioned above.

If a UE 102 is configured by higher layers to transmit a PUSCH repetition in a set of symbols of a slot as mentioned above and the UE 102 detects a DCI format 2_0 with a slot format value (e.g., other than 255) that indicates a slot format with a subset of symbols from the set of symbols as downlink or flexible, or the UE 102 detects a DCI format 10, DCI format 1_1, or DCI format 0_1 indicating to the UE 102 to receive CSI-RS or PDSCH in a subset of symbols from the set of symbols, then the UE 102 may not expect to cancel the transmission in symbols from the subset of symbols that occur, relative to a last symbol of a CORESET where the UE 102 detects the DCI format 2_0 or the DCI format 1_0 or the DCI format 1_1 or the DCI format 0_1 after a number of symbols that is smaller than the PUSCH preparation time for the repetition as mentioned above, or the UE 102 cancels the PUSCH repetition in remaining symbols from the set of symbols.

For a set of symbols of a slot that are indicated as flexible by higher layer parameters (e.g., TDD-UL-DL-ConfigurationCommon and TDD-UL-DL-ConfigDedicated), when provided to a UE 102, or when higher layer parameters (e.g., TDD-UL-DL-ConfigurationCommon and TDD-UL-DL-ConfigDedicated) are not provided to the UE 102, and if the UE 102 does not detect a DCI format 2_0 providing a slot format for the slot, if the UE 102 is configured by higher layers to transmit PUSCH repetition in the set of symbols of the slot as mentioned above, the UE 102 may not transmit the PUSCH repetition in the slot in symbols from the set of symbols in the slot, if any, starting from a symbol that is a number of symbols equal to the PUSCH preparation time N_2r for the corresponding PUSCH timing capability after a last symbol of a control resource set where the UE 102 is configured to monitor PDCCH for DCI format 2_0, or the UE 102 may not expect to cancel the transmission of the PUSCH repetition in symbols from the set of symbols in the slot, if any, starting before a symbol that is a number of symbols equal to the PUSCH preparation time N_2r for the corresponding PUSCH timing capability after a last symbol of a CORESET where the UE is configured to monitor PDCCH for DCI format 2_0.

As mentioned above, there may be two kinds of PUSCH repetitions. One may be referred to as slot-based repetition(s), which means repetitions may use consecutive slots and the same time-domain resource allocation (e.g., starting symbol and/or length) may be applied to each slot. The other may be referred as mini-slot-based repetition(s), which means multiple PUSCH repetitions may be in one slot and/or PUSCH repetitions in consecutive available slots may use different starting symbols and or durations/lengths.

Whether to apply slot-based repetitions or mini-slot-based repetitions and/or how to switch between slot-based repetitions and mini-slot-based repetitions is described herein.

In a design, whether to apply slot-based repetitions or mini-slot-based repetitions may be explicitly configured by RRC (i.e., by using the RRC message (the RRC signaling)). For example, for a grant-free PUSCH transmission (e.g., Type 1 configured grant or Type 2 configured grant), if an RRC parameter mini-slot-repetition-enabler in a configured grant configuration (e.g., ConfiguredGrantConfig) is configured or indicated as true, mini-slot-based repetitions may be applied. If the RRC parameter mini-slot-repetition-enabler in a configured grant configuration (e.g., ConfiguredGrantConfig) is not configured or it is indicated as false, slot-based repetitions may be applied. For grant-based PUSCH transmission (e.g., PUSCH assigned (e.g., scheduled) by a DCI format 0_0/0_1 with CRC scrambled by C-RNTI, MCS-C-RNTI, TC-RNTI, or SP-CSI-RNTI), if a RRC parameter mini-slot-repetition-enabler in PUSCH configuration (e.g., PUSCH-Config) is configured or indicated as true, mini-slot-based repetitions may be applied. If the RRC parameter mini-slot-repetition-enabler in PUSCH configuration (e.g., PUSCH-Config) is not configured or it is indicated as false, slot-based repetitions may be applied. For retransmission of grant-free transmission (e.g., PUSCH scheduled by a DCI format 0_0/0_1 with CRC scrambled by CS-RNTI with NDI=1), whether to apply slot-based repetitions or mini-slot-based repetitions may follow the RRC parameter in a configured grant configuration as above or follow the RRC parameter in PUSCH configuration as above.

In yet another design, slot-based repetitions and mini-slot-based repetitions may use different parameters indicating the number of repetitions (also referred to herein as a repetition parameter). For example, for a grant-free PUSCH transmission (e.g., Type 1 configured grant or Type 2 configured grant), if a RRC parameter repK-new (indicating the number of repetitions for mini-slot-based repetitions) which may be different from repK (indicating the number of repetitions for slot-based repetitions) in a configured grant configuration (e.g., ConfiguredGrantConfig) is configured and/or indicated as greater than 1, mini-slot-based repetitions may be applied. If both repK-new and repK are configured, repK-new may override repK and/or mini-slot-based repetitions may be applied. In yet another example, If both repK-new and repK are configured, repK may override repK-new and/or slot-based repetitions may be applied.

For grant-based PUSCH transmission (e.g., PUSCH assigned (e.g., scheduled) by a DCI format 0_0/0_1 with CRC scrambled by C-RNTI, MCS-C-RNTI, TC-RNTI, or SP-CSI-RNTI), if a RRC parameter pusch-AggregationFactor-new (indicating the number of repetitions for mini-slot-based repetitions) which may be different from pusch-AggregationFactor (indicating the number of repetitions for slot-based repetitions) in PUSCH configuration (e.g., PUSCH-Config) is configured and/or indicated as greater than 1, mini-slot-based repetitions may be applied. If both pusch-AggregationFactor-new and pusch-AggregationFactor are configured, pusch-AggregationFactor-new may override pusch-AggregationFactor and/or mini-slot-based repetitions may be applied. In yet another example, if both pusch-AggregationFactor-new and pusch-AggregationFactor are configured, pusch-AggregationFactor may override pusch-AggregationFactor-new and/or slot-based repetitions may be applied. For retransmission of a grant-free transmission (e.g., PUSCH scheduled by a DCI format 0_0/0_1 with CRC scrambled by CS-RNTI with NDI=1), whether to apply slot-based repetitions or mini-slot-based repetitions may follow the RRC parameter in a configured grant configuration as above or may follow the RRC parameter in PUSCH configuration as above.

In yet another design, whether to apply slot-based repetitions or mini-slot-based repetitions may depend on a periodicity parameter. For example, for grant-free PUSCH transmission (e.g., Type 1 configured grant or Type 2 configured grant), if a RRC parameter periodicity in a configured grant configuration (e.g., ConfiguredGrantConfig) is greater than (or less than) a certain value (e.g., a single predetermined value, and/or a threshold), mini-slot-based repetitions may be applied. If the RRC parameter periodicity in configured grant configuration (e.g., ConfiguredGrantConfig) is less than (or greater than) a certain value (e.g., a single predetermined value and/or a threshold), slot-based repetitions may be applied.

In yet another design, whether to apply slot-based repetitions or mini-slot-based repetitions may depend on a modulation and coding scheme (MCS) table. For example, for a grant-free PUSCH transmission (e.g., Type 1 configured grant or Type 2 configured grant) and/or retransmission of a grant-free transmission (e.g., PUSCH scheduled by a DCI format 0_0/0_1 with CRC scrambled by CS-RNTI with NDI=1), if a low spectral efficiency (SE) MCS table is configured (e.g., a RRC parameter mcs-Table or mcs-TableTransformPrecoder in configured grant configuration (e.g., ConfiguredGrantConfig) is configured as qam64LowSE), mini-slot-based repetitions may be applied, otherwise, slot-based repetitions may be applied. In yet another design, if a low SE MCS table is configured (e.g., a RRC parameter mcs-Table or mcs-TableTransformPrecoder in configured grant configuration (e.g., ConfiguredGrantConfig) is configured as qam64LowSE), slot-based repetitions may be applied, otherwise, mini-slot-based repetitions may be applied. For grant-based PUSCH transmission (e.g., PUSCH assigned (e.g., scheduled) by a DCI format 0_0/0_1 with CRC scrambled by C-RNTI, MCS-C-RNTI, TC-RNTI, or SP-CSI-RNTI), if a low SE MCS table is configured (e.g., a RRC parameter mcs-Table or mcs-TableTransformPrecoder in PUSCH configuration (e.g., PUSCH-Config) is configured as qam64LowSE), mini-slot-based repetitions may be applied, otherwise, slot-based repetitions may be applied. In yet another design, if low SE MCS table is configured (e.g., a RRC parameter mcs-Table or mcs-TableTransformPrecoder in PUSCH configuration (e.g., PUSCH-Config) is configured as qam64LowSE), slot-based repetitions may be applied, otherwise, mini-slot-based repetitions may be applied.

In yet another design, whether to apply slot-based repetitions or mini-slot-based repetitions may depend on a radio network temporary identifier (RNTI). For example, for PUSCH transmission scheduled by DCI format 0_0/0_1 with CRC scrambled by MCS-C-RNTI and repetitions are configured, mini-slot-based repetitions (or slot-based repetitions) may be always applied. In yet another example, a new RNTI (e.g., REP-C-RNTI) may be introduced for mini-slot-based repetitions. Namely, for PUSCH transmission scheduled by DCI format with CRC scrambled by REP-C-RNTI and repetitions are configured, mini-slot-based repetitions may be always applied.

In yet another design, whether to apply slot-based repetitions or mini-slot-based repetitions may depend on a downlink control information (DCI) format. For example, mini-slot-based repetitions may be applied only when non-fallback DCI (e.g., DCI format 0_1) is used. In yet another example, a new DCI format may be introduced for mini-slot-based repetitions. Namely, for PUSCH transmission scheduled by the new DCI format and/or grant-free transmission activated by the new DCI format, mini-slot-based repetitions when repetitions are enabled. The new DCI-format may include an indication for mini-slot-repetitions and/or a parameter indicating a number of mini-slot-based repetitions.

In yet another design, whether to apply slot-based repetitions or mini-slot-based repetitions may depend on a slot configuration. For example, if a slot configuration period configured by RRC is larger than (or smaller than) a threshold, mini-slot-based repetitions may be applied, otherwise, slot-based repetitions may be applied. In yet another example, if a number of slots with only downlink symbols configured by RRC is larger than (or smaller than) a threshold, mini-slot-based repetitions may be applied, otherwise, slot-based repetitions may be applied. In yet another example, if a number of slots with only uplink symbols configured by RRC is larger than (or smaller than) a threshold, mini-slot-based repetitions may be applied, otherwise, slot-based repetitions may be applied. In yet another example, if a number of downlink symbols configured by RRC is larger than (or smaller than) a threshold, mini-slot-based repetitions may be applied, otherwise, slot-based repetitions may be applied. In yet another example, if a number of uplink symbols configured by RRC is larger than (or smaller than) a threshold, mini-slot-based repetitions may be applied, otherwise, slot-based repetitions may be applied.

When mini-slot-based repetitions are configured and/or enabled as mentioned above, fallback behavior (e.g., slot-based repetitions may be applied (e.g., for a certain condition) even if mini-slot-based repetitions are configured/enabled) may be supported in some cases. In a design, if the UE 102 detects fallback DCI (e.g., DCI format 0_0) in the CSS (e.g., and/or the CSS associated with the CORESET #0), the UE 102 may perform slot-based repetitions even if mini-slot-based repetitions are configured/enabled as mentioned above. For example, if mini-slot-based repetitions are configured by RRC (i.e., the RRC message (the RRC signaling)), if the UE 102 detects the fallback DCI (e.g., the DCI format 0_0) in the CSS (e.g., and/or the CSS associated with the CORESET #0), the UE 102 may perform slot-based repetitions. If both repK-new (pusch-AggregationFactor-new) and repK (pusch-AggregationFactor) are configured, in the case that the UE 102 detects the fallback DCI (e.g., DCI format 0_0) in the CSS (e.g., and/or the CSS associated with the CORESET #0), the UE 102 may perform slot-based repetitions and the repetition number repK (pusch-AggregationFactor) may be applied. In yet another design, the UE 102 may perform slot-based repetitions according to RNTI used for scrambling of CRC attached to the DCI. For example, if a new RNTI (e.g., REP-C-RNTI) is configured for mini-slot-based repetitions and if the UE 102 detects the DCI with CRC scrambled by a different RNTI (e.g., C-RNTI), the UE 102 may perform slot-based repetitions.

Namely, in a case that the DCI format 0_0 is detected in the CSS, the slot-based repetition may be used (e.g., by the UE 102). For example, even if the mini-slot based repetitions are configured as being enabled, in a case that the DCI format 0_0 is detected in the CSS, the UE 102 may perform the slot-based repetitions. Namely, if the mini-slot based repetitions are configured as being enabled, in a case that the DCI format(s) (e.g., the DCI format 0_0 and/or the DCI format 0_1) is detected in the USS, the UE 102 may perform the mini slot-based repetitions.

Additionally or alternatively, in a case that the DCI format(s) (e.g., the DCI format 0_0 and/or the DCI format 0_1) is detected in the CORESET #0 (i.e., the CORESET with the index "0"), the slot-based repetition may be used. For example, even if the mini-slot based repetitions are configured as being enabled, in a case that the DCI format(s) (e.g., the DCI format 0_0 and/or the DCI format 0_1) is detected in the CORESET #0 (e.g., the search space (e.g., the CSS) associated with the CORESET #0), the UE 102 may perform the slot-based repetitions. Namely, if the mini-slot based repetitions are configured as being enabled, in a case that the DCI format(s) (e.g., the DCI format 0_0 and/or the DCI format 0_1) is detected in the CORESET other than in the CORESET #0, the UE 102 may perform the mini slot-based repetitions.

Additionally or alternatively, in a case that the DCI format(s) (e.g., the DCI format 0_0 and/or the DCI format 0_1) is detected in the search space set #0 (i.e., the search space set with the index "0"), the slot-based repetition may be used. For example, even if the mini-slot based repetitions are configured as being enabled, in a case that the DCI format(s) (e.g., the DCI format 0_0 and/or the DCI format 0_1) is detected in the search space set #0, the UE 102 may perform the slot-based repetitions. Namely, if the mini-slot based repetitions are configured as being enabled, in a case that the DCI format(s) (e.g., the DCI format 0_0 and/or the DCI format 0_1) is detected in the search space set other than the search space set #0, the UE 102 may perform the mini slot-based repetitions.

Multi-segment transmissions as well as mini-slot repetitions may also be supported for configured grant and/or grant-based PUSCH transmission. Mini-slot repetitions and/or multi-segment transmissions may be enabled and/or configured commonly or separately for each configured grant and/or each PUSCH configuration.

For example, one or more actual PUSCH repetitions in one slot, or two or more actual PUSCH repetitions across slot boundary in consecutive available slots, may be supported using one UL grant for dynamic PUSCH, and one configured grant configuration for configured grant PUSCH by Option-A. The number of the repetitions signaled (dynamically signaled, e.g., DCI indicated, or semi-statically signaled, e.g., RRC configured, or combination of them) by gNB 160 may represent the "nominal" number of repetitions. The actual number of repetitions can be larger than the nominal number. The time domain resource assignment (TDRA) field in the DCI or the TDRA parameter in the type 1 configured grant indicates the resource for the first "nominal" repetition. The time domain resources for the remaining repetitions are derived based at least on the resources for the first repetition and the UL/DL direction of the symbols. If a "nominal" repetition (transmission occasion) goes across the slot boundary or DL/UL switching point, this "nominal" repetition (transmission occasion) may be split into multiple PUSCH repetitions (transmission occasions), with one PUSCH repetition (transmission occasion) in each UL period in a slot (the behavior here may be referred to as segmentation). In a case that multiple configurations of configured grants and/or multiple configurations of PUSCH transmissions are supported, Option-A may be configured and/or enabled for each configured grant configuration and/or each PUSCH transmission configuration separately or commonly. One or more new tables of TDRA may be introduced for Option-A. The new table(s) of TDRA may be fixed by specification (e.g., a defaulted table). The new table(s) of TDRA may be RRC configured. The new table(s) of TDRA may be commonly configured for multiple configurations of configured grants and/or multiple configurations of PUSCH transmissions. The new table(s) of TDRA may be configured and/or enabled for each configured grant configuration and/or each PUSCH transmission configuration separately. How to determine the table of TDRA may follow the same procedures as other parameter determination described above.

In yet another example, one or more PUSCH repetitions in one slot, or two or more PUSCH repetitions across slot boundary in consecutive available slots, are supported using one UL grant for dynamic PUSCH, and one configured grant configuration for configured grant PUSCH by Option-B. The time domain resource assignment (TDRA) field in the DCI or the TDRA parameter in the type 1 configured grant indicates an entry in the higher layer configured table. The number of repetitions, starting symbols of each repetition, length of each repetition, and mapping of the repetitions to slots can be obtained from each entry in the table. More than one repetition can be mapped to one slot. The resource assignment for each repetition is contained within one slot. Each transmitted repetition is contained within one UL period in a slot. In a case that multiple configurations of configured grants and/or multiple configurations of PUSCH transmissions are supported, Option-B may be configured and/or enabled for each configured grant configuration and/or each PUSCH transmission configuration separately or commonly. One or more new tables of TDRA may be introduced for Option-B. The new table(s) of TDRA may be fixed by specification (e.g., a defaulted table). The new table(s) of TDRA may be RRC configured. The new table(s) of TDRA may be commonly configured for multiple configurations of configured grants and/or multiple configurations of PUSCH transmissions. The new table(s) of TDRA may be configured and/or enabled for each configured grant configuration and/or each PUSCH transmission configuration separately. How to determine the table of TDRA may follow the same procedures as other parameter determination described above.

Option-A and Option-B may be supported simultaneously. For example, Option-A may be enabled and/or configured for one of multiple configurations while Option-B may be enabled and/or configured for another one of multiple configurations. In yet another example, Option-A (or Option-B) may be enabled and/or configured for configured grant while Option-B (or Option-A) may be enabled and/or configured for grant-based PUSCH. In yet another example, Option-A (or Option-B) may be enabled and/or configured for configured grant Type 1 while Option-B (or Option-A) may be enabled and/or configured for configured grant Type 2.

For both Option-A and Option-B, frequency hopping may be supported. For Option-A, dynamic indication of the nominal number of repetitions in the DCI scheduling dynamic PUSCH is supported for PUSCH enhancements. The dynamic indication can be enabled or disabled by the gNB.

Option-A may be used with the following update: the time domain resource assignment (TDRA) field in the DCI or the TDRA parameter in the type 1 configured grant indicates the resource for the first "nominal" repetition. In addition, the detailed interaction with the procedure of UL/DL direction determination is described in the following.

Four cases are considered here. The first case (Case 1) is for dynamic grant (DG) PUSCH (e.g., DG PUSCH transmission). Namely, the UL transmission(s) (e.g., PUSCH transmission) (including repetitions) may be dynamically scheduled by an uplink grant in a DCI (e.g., the DCI format(s) for the uplink with the CRC scrambled by the C-RNTI). The second case (Case 2) is for configured grant (CG) PUSCH (e.g., CG PUSCH transmission, including repetitions) other than the first Type 2 CG PUSCH transmission (including all the repetitions) activated by an UL grant (e.g., the first PUSCH transmission corresponding to Type 2 CG). The third case (Case 3) is for the first Type 2 CG PUSCH transmission (including all the repetitions) activated by an UL grant. The fourth case (Case 4) is for PUSCH retransmission corresponding to the configured grant. Namely, the PUSCH retransmission (including repetitions) is scheduled by a PDCCH with CRC scrambled by CS-RNTI with NDI=. In different cases, mini-slot repetitions and/or multi-segment transmissions may have different interactions with procedure of UL/DL direction determination.

For DG PUSCH transmission (Case 1), how to handle the interaction of enhanced PUSCH (including mini-slot repetitions and/or multi-segment transmissions) with DL/UL directions may depend on whether the configuration on the dynamic SFI is configured or not. Here, the configuration on the dynamic SFI may includes information indicating monitoring of the DCI format 20 (as described above) is configured to the UE 102. Namely, for DG PUSCH transmission, based on the whether or not the configuration on the dynamic SFI is configured, the UE 102 may determine the interaction with the procedure of UL/DL direction.

For DG PUSCH transmission, for the case that (e.g., in a case that) the dynamic SFI is not configured (Case 1-1), semi-static flexible symbols may be used for PUSCH transmission (e.g., DG PUSCH transmission). The segmentation may occur around semi-static DL symbols. Namely, the PUSCH may be divided into two or more PUSCHs around semi-static DL symbols (e.g., based on a position(s) (e.g., time domain position(s)) of semi-static DL symbols). The handling method here may be referred to as Option 1-1. Namely, Option 1-1 may include that PUSCH transmission may be performed on the semi-static flexible symbols. Additionally or alternatively, Option 1-1 may include that the segmentation for the PUSCH occurs around the semi-static DL symbols for PUSCH transmission.

Here, the semi-static UL symbol(s), the semi-static DL symbol(s), and/or the semi-static flexible symbol(s) may be configured by using the RRC message. Namely, the gNB 160 may transmit, by using the RRC message, information used for configuring the semi-static UL symbol(s), the semi-static DL symbol(s), and/or the semi-static flexible symbol(s). The UE 102 may determine the semi-static UL symbol(s), semi-static DL symbol(s), and/or the semi-static flexible symbol(s) based on the information included in the RRC message.

For DG PUSCH transmission, for the case that (e.g., in a case that) the dynamic SFI is configured (Case 1-2), the behaviour (e.g., the interaction with the procedure of UL/DL direction) may not depend on (e.g., may be independent of) the dynamic SFI, which may be referred to as Option 1-2-1. For example, for Option 1-2-1-1, the same handling method as Option 1-1 may be applied. Namely, semi-static flexible symbols are used for PUSCH (e.g., DG PUSCH transmission). The segmentation occurs around semi-static DL symbols. However, the conflict may happen between dynamic SFI (e.g., DL symbol(s) indicated by the dynamic SFI (e.g., information included in the DCI format 2_0)) and symbol(s) (e.g., flexible symbol(s)) indicated by the information included in the RRC message) used for PUSCH transmission, which may or may not be considered as an error case. In a design (Option 1-2-1-1a), the UE does not expect any semi-static flexible symbol to be indicated as DL within the PUSCH transmission time window. In yet another design (Option 1-2-1-1b), no error case is defined, and in general all semi-static flexible symbols are used for PUSCH within the PUSCH transmission time window. Namely, the UE 102 may perform the PUSCH transmission in the semi-static flexible symbol(s) (e.g., that is assumed as symbol(s) used for UL transmission). In yet another example (Option 1-2-1-2), the semi-static DL and/or semi-static flexible symbols are not used for PUSCH. The segmentation occurs around semi-static DL symbol(s) and/or semi-static flexible symbol(s). In yet another example (Option 1-2-1-3), dynamic indication in UL grant on which set of semi-static flexible symbols are used for PUSCH. Segmentation occurs around semi-static DL and the dynamically indicated invalid symbols. In yet another example (Option 1-2-1-4), predefined rules to determine which set of semi-static flexible symbols are used for PUSCH transmission. The segmentation occurs around semi-static DL and the invalid symbols as defined in the rules. Namely, the UE 102 may perform PUSCH transmission in the set of semi-static flexible symbol(s), and the set of semi-static symbol(s) for the PUSCH transmission may be specified (e.g., by the specification) and be known information between the gNB 160 and the UE 102.

For DG PUSCH transmission, for the case that dynamic SFI is configured (Case 1-2), the behaviour may depend on dynamic SFI, which may be referred to as Option 1-2-2. Namely, the UE may use SFI to determine the symbols to perform the PUSCH transmission. For example (Option 1-2-2-1), in a case the configuration on the dynamic SFI is configured and the SFI included in the DCI format 2_0 is received, the segmentation occurs around semi-static DL symbols and/or dynamic DL symbol(s) and/or dynamic flexible symbol(s). Here, the dynamic DL symbol(s) and/or the dynamic flexible symbol(s) may be indicated by the SFI included in the DCI format 2_0. In yet another example (Option 1-2-2-2), in a case the configuration on the dynamic SFI is configured and the SFI included in the DCI format 2_0 is received, the dynamic flexible symbol(s) are used for PUSCH transmission. The segmentation occurs around semi-static DL symbols and/or dynamic DL symbols. In yet another example (Option 1-2-2-3), in case the configuration on the dynamic SFI is configured and the SFI included in the DCI format 2_0 is received, the dynamic flexible symbol(s) are used for PUSCH transmission. A repetition (e.g., the UE 102 may not perform the PUSCH transmission (e.g., including the repetition)) is not transmitted if it (e.g., the transmission occasion(s) (e.g., of the repetition)) conflicts with the dynamic DL symbol(s). In yet another example (Option 1-2-2-4), in a case the configuration on the dynamic SFI is configured and the SFI included in the DCI format 2_0 is received, a repetition is not transmitted (e.g., the UE 102 may not perform PUSCH transmission (e.g., including the repetition) if it (e.g., the transmission occasion(s) (e.g., of the repetition)) conflicts with the dynamic DL symbol(s) and/or the dynamic flexible symbol(s). In yet another example (Option 1-2-2-5), in a case that the configuration on the dynamic SFI is configured and the SFI included in the DCI format 2_0 is not received, a repetition is not transmitted (e.g., the UE 102 may not perform PUSCH transmission (e.g., including the repetition) if it (e.g., the transmission occasion(s) (e.g., of the repetition)) conflicts with the semi-static flexible symbol(s).

For CG PUSCH transmission other than the first Type 2 CG PUSCH transmission (including all the repetitions) activated by an UL grant (Case 2), how to handle the interaction of enhanced PUSCH (including mini-slot repetitions and/or multi-segment transmissions) with DL/UL directions may depend on whether the configuration on the dynamic SFI is configured or not.

For CG PUSCH transmission other than the first Type 2 CG PUSCH transmission, for the case that dynamic SFI is not configured (Case 2-1), semi-static flexible symbols may be used for PUSCH. Segmentation may occur around semi-static DL symbols. The handling method here may be referred to as Option 2-1.

For CG PUSCH transmission other than the first Type 2 CG PUSCH transmission, for the case that dynamic SFI is configured (Case 2-2), the behaviour (e.g., the interaction with the procedure of UL/DL direction) may not depend on (e.g., may be independent of) the dynamic SFI, which may be referred to as Option 2-2-1. For example, for Option 2-2-1-1, semi-static DL symbol(s) and/or semi-static flexible symbols are not used for PUSCH. Segmentation occurs around semi-static DL and/or semi-static flexible symbols. In yet another example (Option 2-2-1-2), pre-defined rules to determine which set of semi-static flexible symbols are used for PUSCH transmission. Segmentation occurs around semi-static DL and the invalid symbols as defined in the rules. Namely, the UE 102 may perform PUSCH transmission in the set of semi-static flexible symbol(s), and the set of semi-static symbol(s) for the PUSCH transmission may be specified (e.g., by the specification) and be known information between the gNB 160 and the UE 102.

For CG PUSCH transmission other than the first Type 2 CG PUSCH transmission, for the case that (e.g., in a case that) the dynamic SFI is configured (Case 2-2), the behaviour (e.g., the interaction with the procedure of UL/DL direction) may depend on dynamic SFI, which may be referred to as Option 2-2-2. Namely, the UE may use SFI to determine the symbols to perform the PUSCH transmission. For example (Option 2-2-2-1), in a case the configuration on the dynamic SFI is configured and the SFI included in the DCI format 2_0 is received, the segmentation occurs around semi-static DL symbols and dynamic DL and/or flexible symbol(s). Here, the dynamic DL symbol(s) and/or the dynamic flexible symbol(s) may be indicated by the SFI included in the DCI format 2_0. In yet another example (Option 2-2-2-2), in a case SFI the configuration on the dynamic is configured and the SFI included in the DCI format 2_0 is received, a repetition is not transmitted (e.g., the UE 102 may not perform the PUSCH transmission (e.g., including the repetition)) if it (e.g., the transmission occasion(s) (e.g., of the repetition)) conflicts with the semi-static DL symbol(s) and the dynamic DL and/or dynamic flexible symbol(s). In yet another example (Option 2-2-2-3), in a case the configuration on the dynamic SFI is configured and the SFI included in the DCI format 2_0 is not received, a repetition (e.g., the UE 102 may not perform PUSCH transmission (e.g., including the repetition) is not transmitted if it (e.g., the transmission occasion(s) (e.g., of the repetition)) conflicts with the semi-static flexible symbol(s).

For the first Type 2 CG PUSCH transmission (including all the repetitions) activated by an UL grant (Case 3), same behavior (e.g., the handling method, the interaction with the procedure of UL/DL direction determination) may be used as DG PUSCH (Case 1). Any option (e.g., Option 1-1, Option 1-2-1, Option 1-2-1-1, Option 1-2-1-1a, Option 1-2-1-1b, Option 1-2-1-2, Option 1-2-1-3, Option 1-2-1-4, Option 1-2-2, Option 1-2-2-1, Option 1-2-2-2, Option 1-2-2-3, Option 1-2-2-4, and/or Option 1-2-2-5) adopted/indicated/configured for Case 1 may be also applied to Case 3. Behaviors for Case 1 and Case 3 may be adopted/indicated/configured commonly or separately. For example, the gNB 160 may commonly configure, (e.g., by using the RRC message), the behavior(s) for Case 1 and Case 3. Additionally or alternatively, the gNB 160 may separately configure, (e.g., by using the RRC message), the behavior(s) for Case 1 and Case 3. Additionally or alternatively, the gNB 160 may commonly indicate, (e.g., by using the MAC CE and/or the DCI (e.g., transmitted on the PDCCH)), the behavior(s) for Case 1 and Case 3. Additionally or alternatively, the gNB 160 may separately indicate, (e.g., by using the MAC CE and/or the DCI (e.g., transmitted on the PDCCH)), the behavior(s) for Case 1 and Case 3. Additionally or alternatively, the behavior(s) for Case 1 and Case 3 may be commonly specified by the specification and may be known information between the gNB 160 and the UE 102. Additionally or alternatively, the behavior(s) for Case 1 and Case 3 may be separately specified by the specification and may be known information between the gNB 160 and the UE 102. Case 1 may use one of options above while Case 3 may use a different one of options above. For example, Option 1-2-1 and/or its sub-options (or Option 1-2-2 and/or its sub-options) may be adopted/indicated/configured for Case 1 while Option 1-2-2 and/or its sub-options (or Option 1-2-1 and/or its sub-options) may be adopted/indicated/configured for Case 3. Option 1-2-1-2 (or Option 1-2-1-1) may be adopted/indicated/configured for Case 1 while Option 1-2-1-1 (or Option 1-2-1-2) may be adopted/indicated/configured for Case 3. Option 1-2-2-2 (or Option 1-2-2-1) may be adopted/indicated/configured for Case 1 while Option 1-2-2-1 (or Option 1-2-2-2) may be adopted/indicated/configured for Case 3. Option 1-2-2-1 (or Option 1-2-2-4) may be adopted/indicated/configured for Case 1 while Option 1-2-2-4 (or Option 1-2-2-1) may be adopted/indicated/configured for Case 3. Option 1-2-2-3 (or Option 1-2-2-4) may be adopted/indicated/configured for Case 1 while Option 1-2-2-4 (or Option 1-2-2-3) may be adopted/indicated/configured for Case 3.

For the first Type 2 CG PUSCH (including all the repetitions) activated by an UL grant (Case 3), the same behavior may be used as CG PUSCH without an associated UL grant (Case 2). Any option (e.g., Option 2-1, Option 2-2-1, Option 2-2-1-1, Option 2-2-1-2, Option 2-2-2, Option 2-2-2-1, Option 2-2-2-2, or Option 2-2-2-3) adopted/indicated/configured for Case 2 may be also applied to Case 3. Behaviors for Case 2 and Case 3 may be adopted/indicated/configured commonly or separately. For example, the gNB 160 may commonly configure, (e.g., by using the RRC message), the behavior(s) for Case 2 and Case 3. Additionally or alternatively, the gNB 160 may separately configure, (e.g., by using the RRC message), the behavior(s) for Case 2 and Case 3. Additionally or alternatively, the gNB 160 may commonly indicate, (e.g., by using the MAC CE and/or the DCI (e.g., transmitted on the PDCCH)), the behavior(s) for Case 2 and Case 3. Additionally or alternatively, the gNB 160 may separately indicate, (e.g., by using the MAC CE and/or the DCI (e.g., transmitted on the PDCCH)), the behavior(s) for Case 2 and Case 3. Additionally or alternatively, the behavior(s) for Case 2 and Case 3 may be commonly specified by the specification and may be known information between the gNB 160 and the UE 102. Additionally or alternatively, the behavior(s) for Case 2 and Case 3 may be separately specified by the specification and may be known information between the gNB 160 and the UE 102. Case 2 may use one of options above while Case 3 may use a different one of options above. For example, Option 2-2-1 and/or its sub-options (or Option 2-2-2 and/or its sub-options) may be adopted/indicated/configured for Case 2 while Option 2-2-2 and/or its sub-options (or Option 2-2-1 and/or its sub-options) may be adopted/indicated/configured for Case 3. Option 2-2-1-2 (or Option 2-2-1-1) may be adopted/indicated/configured for Case 2 while Option 2-2-1-1 (or Option 2-2-1-2) may be adopted/indicated/configured for Case 3. Option 2-2-2-2 (or Option 2-2-2-1) may be adopted/indicated/configured for Case 2 while Option 2-2-2-1 (or Option 2-2-2-2) may be adopted/indicated/configured for Case 3.

For the first Type 2 CG PUSCH (including all the repetitions) activated by an UL grant (Case 3), different behavior may be adopted/indicated/configured. For example (Option 3-1), no matter whether dynamic SFI is configured or not, semi-static flexible symbols are used for PUSCH and segmentation occurs around semi-static DL symbols. In yet another example (Option 3-2), no matter whether dynamic SFI is configured or not, only semi-static UL symbols are used for PUSCH and segmentation occurs around semi-static DL and/or semi-static flexible symbol(s). In yet another example (Option 3-3), no matter whether dynamic SFI is configured or not, a repetition is not transmitted if it conflicts with a semi-static flexible symbol. In yet another example (Option 3-4), no matter whether dynamic SFI is configured or not, semi-static flexible symbols are used for PUSCH and a repetition is not transmitted if it conflicts with a semi-static DL symbol.

For PUSCH retransmission (including repetitions) of configured grant (Case 4), the same behavior (e.g., the handling method, the interaction with the procedure of UL/DL direction determination) as DG PUSCH (Case 1) may be used. Any option (e.g., Option 1-1, Option 1-2-1, Option 1-2-1-1, Option 1-2-1-1a, Option 1-2-1-1b, Option 1-2-1-2, Option 1-2-1-3, Option 1-2-1-4, Option 1-2-2, Option 1-2-2-1, Option 1-2-2-2, Option 1-2-2-3, Option 1-2-2-4, and/or Option 1-2-2-5) adopted/indicated/configured for Case 1 may be also applied to Case 4. Behaviors for Case 1 and Case 4 may be adopted/indicated/configured commonly or separately. For example, the gNB 160 may commonly configure, (e.g., by using the RRC message), the behavior(s) for Case 1 and Case 4. Additionally or alternatively, the gNB 160 may separately configure, (e.g., by using the RRC message), the behavior(s) for Case 1 and Case 4. Additionally or alternatively, the gNB 160 may commonly indicate, (e.g., by using the MAC CE and/or the DCI (e.g., transmitted on the PDCCH)), the behavior(s) for Case 1 and Case 4. Additionally or alternatively, the gNB 160 may separately indicate, (e.g., by using the MAC CE and/or the DCI (e.g., transmitted on the PDCCH)), the behavior(s) for Case 1 and Case 4. Additionally or alternatively, the behavior(s) for Case 1 and Case 4 may be commonly specified by the specification and may be known information between the gNB 160 and the UE 102. Additionally or alternatively, the behavior(s) for Case 1 and Case 4 may be separately specified by the specification and may be known information between the gNB 160 and the UE 102. Case 1 may use one of options above while Case 4 may use a different one of options above. For example, Option 1-2-1 and/or its sub-options (or Option 1-2-2 and/or its sub-options) may be adopted/indicated/configured for Case 1 while Option 1-2-2 and/or its sub-options (or Option 1-2-1 and/or its sub-options) may be adopted/indicated/configured for Case 4. Option 1-2-1-2 (or Option 1-2-1-1) may be adopted/indicated/configured for Case 1 while Option 1-2-1-1 (or Option 1-2-1-2) may be adopted/indicated/configured for Case 4. Option 1-2-2-2 (or Option 1-2-2-1) may be adopted/indicated/configured for Case 1 while Option 1-2-2-1 (or Option 1-2-2-2) may be adopted/indicated/configured for Case 4. Option 1-2-2-1 (or Option 1-2-2-4) may be adopted/indicated/configured for Case 1 while Option 1-2-2-4 (or Option 1-2-2-1) may be adopted/indicated/configured for Case 4. Option 1-2-2-3 (or Option 1-2-2-4) may be adopted/indicated/configured for Case 1 while Option 1-2-2-4 (or Option 1-2-2-3) may be adopted/indicated/configured for Case 4.

Additionally or alternatively, for PUSCH retransmission (including repetitions) of configured grant (Case 4), the same behavior as CG PUSCH without an associated UL grant (Case 2) may be used. Any option (e.g., Option 2-1, Option 2-2-1, Option 2-2-1-1, Option 2-2-1-2, Option 2-2-2, Option 2-2-2-1, Option 2-2-2-2, or Option 2-2-2-3) adopted/ indicated/configured for Case 2 may be also applied to Case 4. Behaviors for Case 2 and Case 4 may be adopted/ indicated/configured commonly or separately. For example, the gNB 160 may commonly configure, (e.g., by using the RRC message), the behavior(s) for Case 2 and Case 4. Additionally or alternatively, the gNB 160 may separately configure, (e.g., by using the RRC message), the behavior(s) for Case 2 and Case 4. Additionally or alternatively, the gNB 160 may commonly indicate, (e.g., by using the MAC CE and/or the DCI (e.g., transmitted on the PDCCH)), the behavior(s) for Case 2 and Case 4. Additionally or alternatively, the gNB 160 may separately indicate, (e.g., by using the MAC CE and/or the DCI (e.g., transmitted on the PDCCH)), the behavior(s) for Case 2 and Case 4. Additionally or alternatively, the behavior(s) for Case 2 and Case 4 may be commonly specified by the specification and may be known information between the gNB 160 and the UE 102. Additionally or alternatively, the behavior(s) for Case 2 and Case 4 may be separately specified by the specification and may be known information between the gNB 160 and the UE 102. Case 2 may use one of options above while Case 4 may use a different one of options above. For example, Option 2-2-1 and/or its sub-options (or Option 2-2-2 and/or its sub-options) may be adopted/indicated/configured for Case 2 while Option 2-2-2 and/or its sub-options (or Option 2-2-1 and/or its sub-options) may be adopted/indicated/ configured for Case 4. Option 2-2-1-2 (or Option 2-2-1-1) may be adopted/indicated/configured for Case 2 while Option 2-2-1-1 (or Option 2-2-1-2) may be adopted/indicated/configured for Case 4. Option 2-2-2-2 (or Option 2-2-2-1) may be adopted/indicated/configured for Case 2 while Option 2-2-2-1 (or Option 2-2-2-2) may be adopted/ indicated/configured for Case 4.

For PUSCH retransmission (including repetitions) of configured grant (Case 4), different behavior may be adopted/ indicated/configured. For example (Option 4-1), no matter whether dynamic SFI is configured or not, semi-static flexible symbols are used for PUSCH and segmentation occurs around semi-static DL symbols. In yet another example (Option 4-2), no matter whether dynamic SFI is configured or not, only semi-static UL symbols are used for PUSCH and segmentation occurs around semi-static DL and/or semi-static flexible symbols. In yet another example (Option 4-3), no matter whether dynamic SFI is configured or not, a repetition is not transmitted if it conflicts with a semi-static flexible symbol. In yet another example (Option 4-4), no matter whether dynamic SFI is configured or not, semi-static flexible symbols are used for PUSCH and a repetition is not transmitted if it conflicts with a semi-static DL symbol.

For the behaviors above, segmentation at slot boundary may be always performed. Namely, the UE 102 may always apply the segmentation at slot boundary for PUSCH transmission (DG PUSCH transmission, CG Type 1 PUSCH transmission, CG Type 2 PUSCH transmission, and/or retransmission corresponding to CG Typ1 and/or CG Type 2 PUSCH transmission(s)).

In case of a repetition not being transmitted as mentioned above, the whole repetition may be dropped, or may be dropped only at the conflicted symbol(s). In yet another design, postpone of a repetition may be applied. Postpone may be applied in the case that dynamic SFT is not configured and symbol conflicts happened as above. Postpone may be applied when the repetition conflicts with a semi-static flexible symbol.

For the handling of conflict with SSB (Synchronization and PBCH (Physical Broadcast Channel) Block) and/or PRACH symbols, any behavior described above may also be adopted/indicated/configured.

In terms of how to interpret the length L (e.g., number of symbols used for a repetition, a PUSCH transmission, a transmission occasion, or a nominal repetition) and the number of repetitions K for all PUSCH transmissions, the time window within which valid symbols (e.g., UL symbols and/or flexible symbols indicated by RRC message and/or dynamic signaling) may be used for transmission is L*K. In yet another design, the time window within which valid symbols (e.g., UL symbols and/or flexible symbols indicated by RRC message and/or dynamic signaling) are used for transmission can be longer than L*K symbols, and it is extended at least in case of semi-static DL symbols. Extension of the time window in case of dynamic DL symbols and/or semi-static flexible symbols and/or reserved symbols (if defined) and/or SSB symbols and/or type-0 CSS in CORESET #0 (as indicated by MIB) may be also applied. A maximum time window size may be defined in specification, configured by RRC message and/or indicated by L1 signaling (e.g., DCI, PDCCH) and/or MAC CE.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include a gNB scheduling module 194. The gNB scheduling module 194 may perform operations for mini-slot-based repetitions as described herein.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

URLLC may coexist with other services (e.g., eMBB). Due to the latency requirement, URLLC may have a highest priority in some approaches. Some examples of URLLC coexistence with other services are given herein (e.g., in one or more of the following Figure descriptions).

Figure 2:
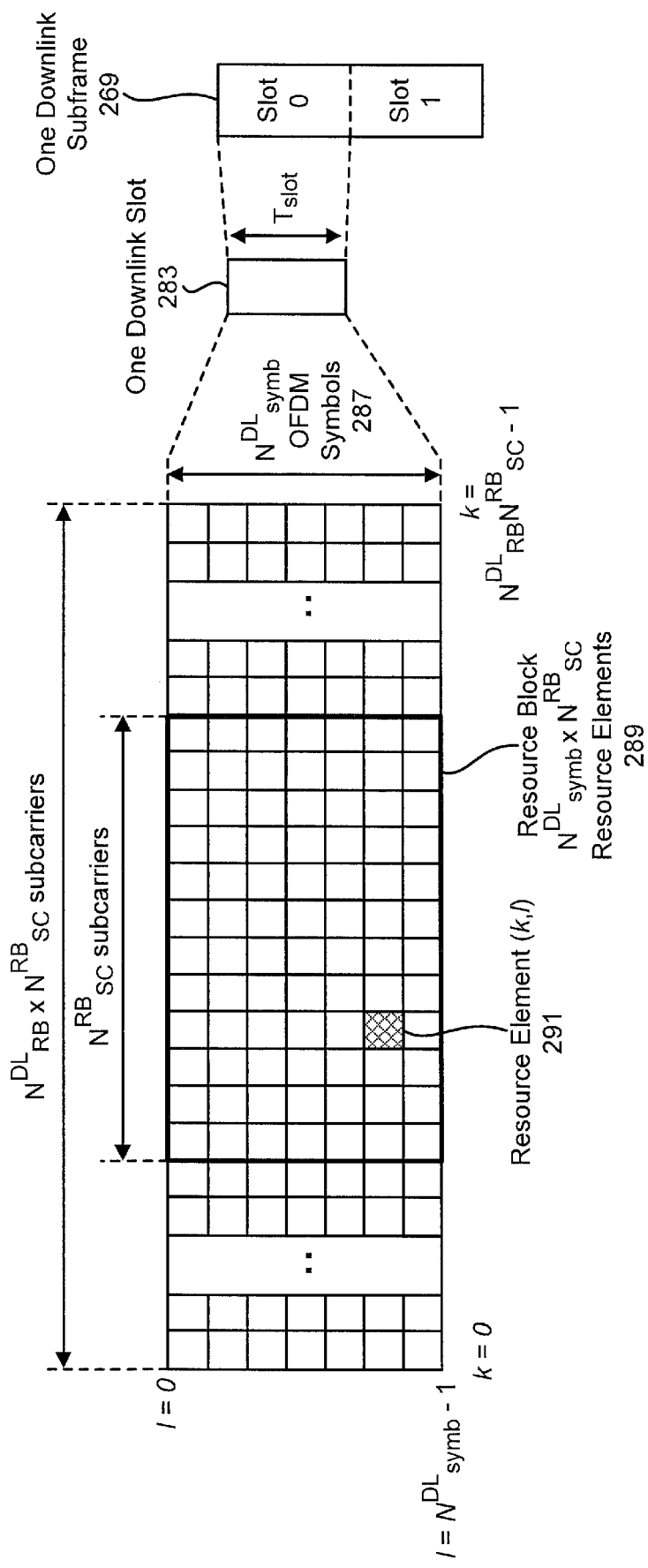
FIG. 2 is a diagram illustrating an example of a resource grid for the downlink.

FIG. 2 is a diagram illustrating one example of a resource grid for the downlink. The resource grid illustrated in FIG. 2 may be utilized in some implementations of the systems and methods disclosed herein. More detail regarding the resource grid is given in connection with FIG. 1.

In FIG. 2, one downlink subframe 269 may include two downlink slots 283. $N^{DL}_{RB}$ is downlink bandwidth configuration of the serving cell, expressed in multiples of $N^{RB}_{sc}$, where $N^{RB}_{sc}$ is a resource block 289 size in the frequency domain expressed as a number of subcarriers, and $N^{DL}_{symb}$ is the number of OFDM symbols 287 in a downlink slot 283. A resource block 289 may include a number of resource elements (RE) 291.

For a PCell, $N^{DL}_{RB}$ is broadcast as a part of system information. For an SCell (including an Licensed Assisted Access (LAA) SCell), $N^{DL}_{RB}$ is configured by a RRC message dedicated to a UE 102. For PDSCH mapping, the available RE 291 may be the RE 291 whose index l fulfils $l \geq l_{data,start}$ and/or $l_{data,end} \geq l$ in a subframe.

In the downlink, the OFDM access scheme with cyclic prefix (CP) may be employed, which may be also referred to as CP-OFDM. In the downlink, PDCCH, enhanced PDCCH (EPDCCH), PDSCH and the like may be transmitted. A downlink radio frame may include multiple pairs of downlink resource blocks (RBs) which is also referred to as physical resource blocks (PRBs). The downlink RB pair is a unit for assigning downlink radio resources, defined by a predetermined bandwidth (RB bandwidth) and a time slot. The downlink RB pair includes two downlink RBs that are continuous in the time domain.

The downlink RB includes twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) and is uniquely identified by the index pair (k,l) in a slot, where k and l are indices in the frequency and time domains, respectively. While downlink subframes in one component carrier (CC) are discussed herein, downlink subframes are defined for each CC and downlink subframes are substantially in synchronization with each other among CCs.

Figure 3:
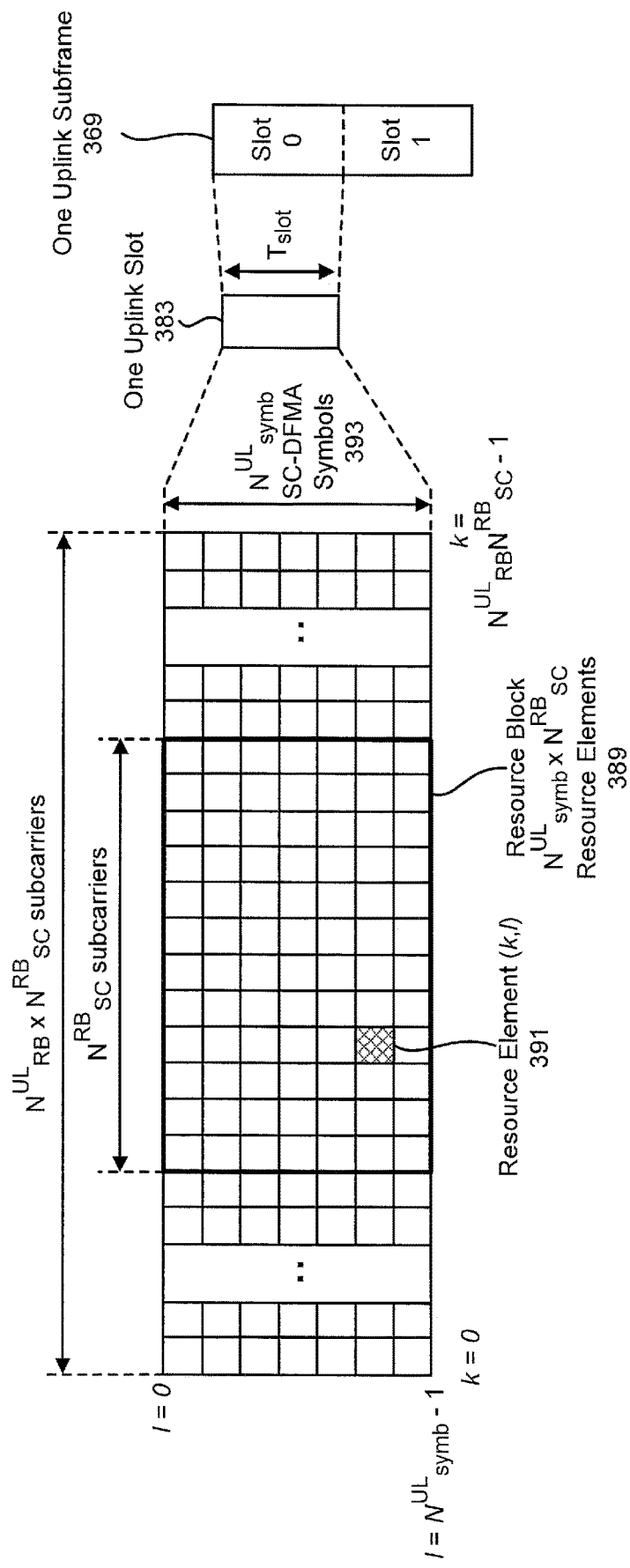
FIG. 3 is a diagram illustrating one example of a resource grid for the uplink.

FIG. 3 is a diagram illustrating one example of a resource grid for the uplink. The resource grid illustrated in FIG. 3 may be utilized in some implementations of the systems and methods disclosed herein. More detail regarding the resource grid is given in connection with FIG. 1.

In FIG. 3, one uplink subframe 369 may include two uplink slots 383. $N^{UL}_{RB}$ is uplink bandwidth configuration of the serving cell, expressed in multiples of $N^{RB}_{sc}$, where $N^{RB}_{sc}$ is a resource block 389 size in the frequency domain expressed as a number of subcarriers, and $N^{UL}_{symb}$ is the number of SC-FDMA symbols 393 in an uplink slot 383. A resource block 389 may include a number of resource elements (RE) 391.

For a PCell, $N^{UL}_{RB}$ is broadcast as a part of system information. For an SCell (including an LAA SCell), $N^{UL}_{RB}$ is configured by a RRC message dedicated to a UE 102.

In the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). In the uplink, PUCCH, PUSCH, PRACH and the like may be transmitted. An uplink radio frame may include multiple pairs of uplink resource blocks. The uplink RB pair is a unit for assigning uplink radio resources, defined by a predetermined bandwidth (RB bandwidth) and a time slot. The uplink RB pair includes two uplink RBs that are continuous in the time domain.

The uplink RB may include twelve sub-carriers in frequency domain and seven (for normal CP) or six (for extended CP) OFDM and/or DFT-S-OFDM symbols in time domain. A region defined by one sub-carrier in the frequency domain and one OFDM and/or DFT-S-OFDM symbol in the time domain is referred to as a RE and is uniquely identified by the index pair (k,l) in a slot, where k and l are indices in the frequency and time domains respectively. While uplink subframes in one component carrier (CC) are discussed herein, uplink subframes are defined for each CC.

Figure 4:
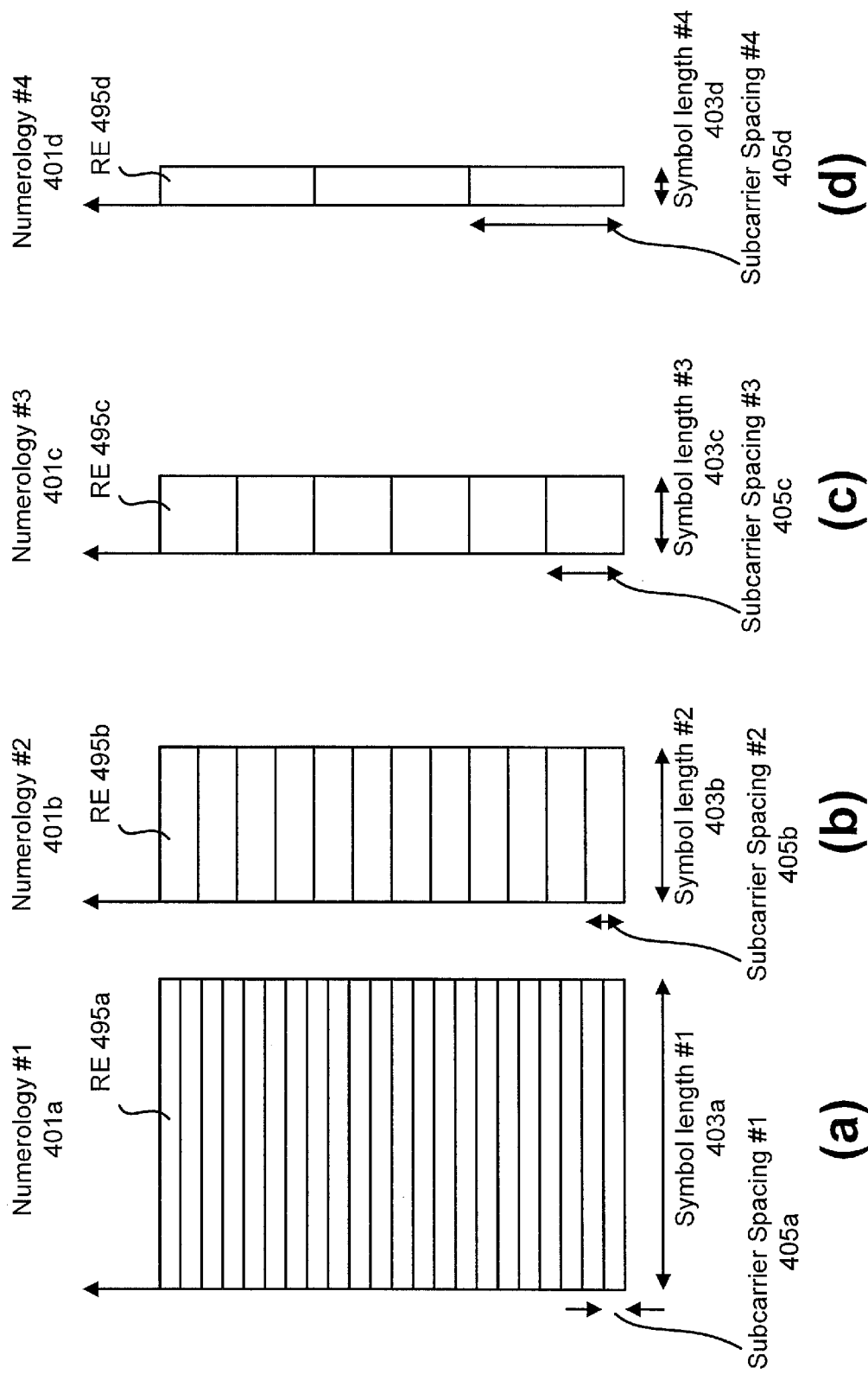
FIG. 4 shows examples of several numerologies.

FIG. 4 shows examples of several numerologies 401. The numerology #1 401a may be a basic numerology (e.g., a reference numerology). For example, a RE 495a of the basic numerology 401a may be defined with subcarrier spacing 405a of 15 kHz in frequency domain and 2048 Ts+CP length (e.g., 160 Ts or 144 Ts) in time domain (i.e., symbol length #1 403a), where Ts denotes a baseband sampling time unit defined as 1/(15000*2048) seconds. For the i-th numerology, the subcarrier spacing 405 may be equal to $15*2^i$ and the effective OFDM symbol length $2048*2^{-i}*Ts$. It may cause the symbol length is $2048*2^{-i}*Ts+CP$ length (e.g., $160*2^{-i}*Ts$ or $144*2^{-i}*Ts$). In other words, the subcarrier spacing of the i+1-th numerology is a double of the one for the i-th numerology, and the symbol length of the i+1-th numerology is a half of the one for the i-th numerology. FIG. 4 shows four numerologies, but the system may support another number of numerologies. Furthermore, the system does not have to support all of the 0-th to the I-th numerologies, i=0, 1, . . . , I.

For example, the first UL transmission on the first SPS resource as above mentioned may be performed only on the numerology #1 (e.g., a subcarrier spacing of 15 kHz). Here, the UE 102 may acquire (detect) the numerology #1 based on a synchronization signal. Also, the UE 102 may receive a dedicated RRC signal including information (e.g., a handover command) configuring the numerology #1. The dedicated RRC signal may be a UE-specific signal. Here, the first UL transmission on the first SPS resource may be performed on the numerology #1, the numerology #2 (a subcarrier spacing of 30 kHz), and/or the numerology #3 (a subcarrier spacing of 60 kHz).

Also, the second UL transmission on the second SPS resource as above mentioned may be performed only on the numerology #3. Here, for example, the UE 102 may receive System Information (e.g., Master Information Block (MIB) and/or System Information Block (SIB)) including information configuring the numerology #2 and/or the numerology #3.

Also, the UE 102 may receive the dedicated RRC signal including information (e.g., the handover command) configuring the numerology #2 and/or the numerology #3. The System Information (e.g., MIB) may be transmitted on BCH (Broadcast Channel) and/or the dedicated RRC signal. The System Information (e.g., SIB) may contain information relevant when evaluating if a UE 102 is allowed to access a cell and/or defines the scheduling of other system information. The System Information (SIB) may contain radio resource configuration information that is common for multiple UEs 102. Namely, the dedicated RRC signal may include each of multiple numerology configurations (the first numerology, the second numerology, and/or the third numerology) for each of UL transmissions (e.g., each of UL-SCH transmissions, each of PUSCH transmissions). Also, the dedicated RRC signal may include each of multiple numerology configurations (the first numerology, the second numerology, and/or the third numerology) for each of DL transmissions (each of PDCCH transmissions).

Figure 5:
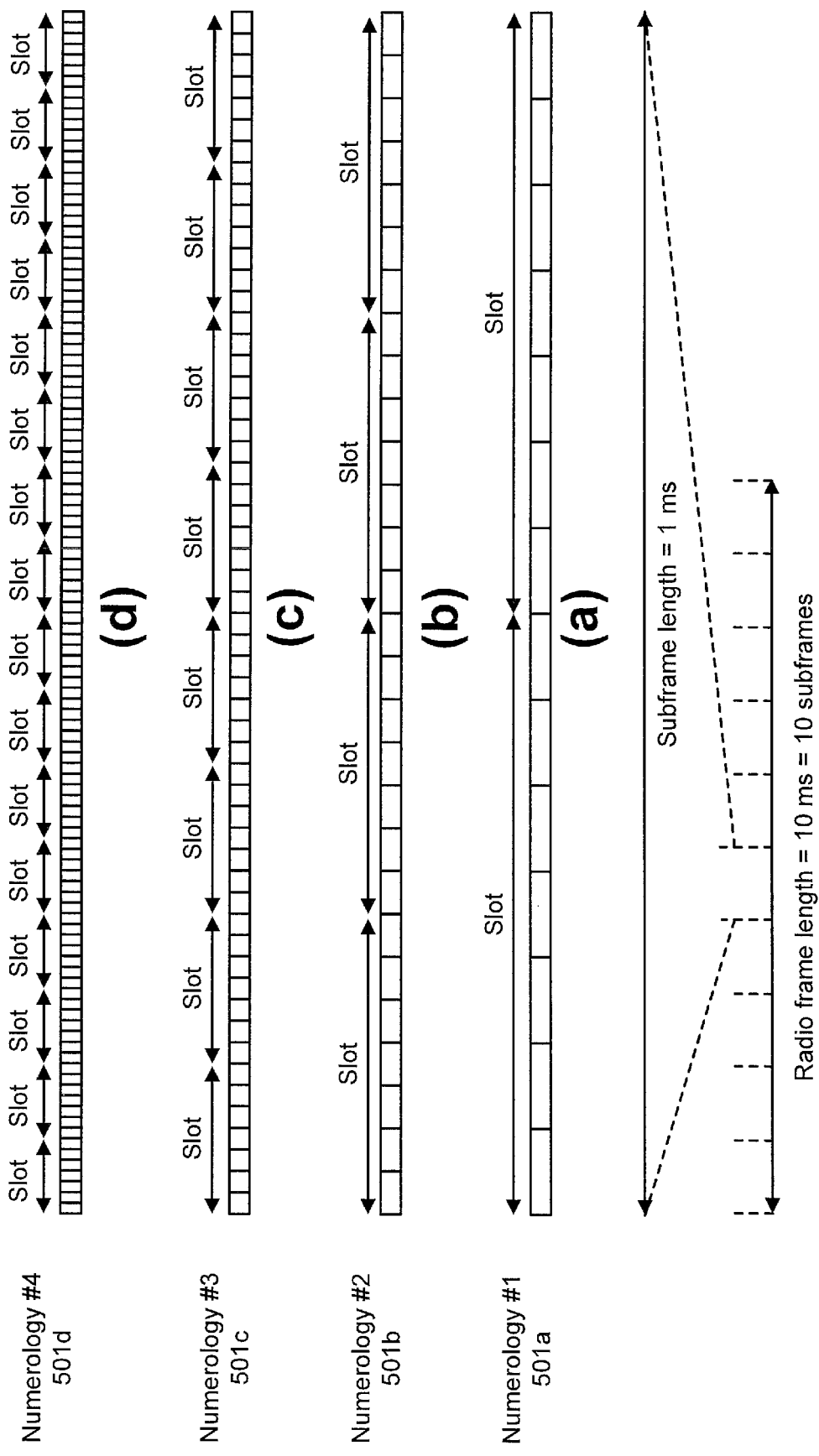
FIG. 5 shows examples of subframe structures for the numerologies that are shown in FIG. 4.

FIG. 5 shows examples of subframe structures for the numerologies 501 that are shown in FIG. 4. Given that a slot 283 includes $N^{DL}_{symb}$ (or $N^{UL}_{symb}$)=7 symbols, the slot length of the i+1-th numerology 501 is a half of the one for the i-th numerology 501, and eventually the number of slots 283 in a subframe (i.e., 1 ms) becomes double. It may be noted that a radio frame may include 10 subframes, and the radio frame length may be equal to 10 ms.

Figure 6:
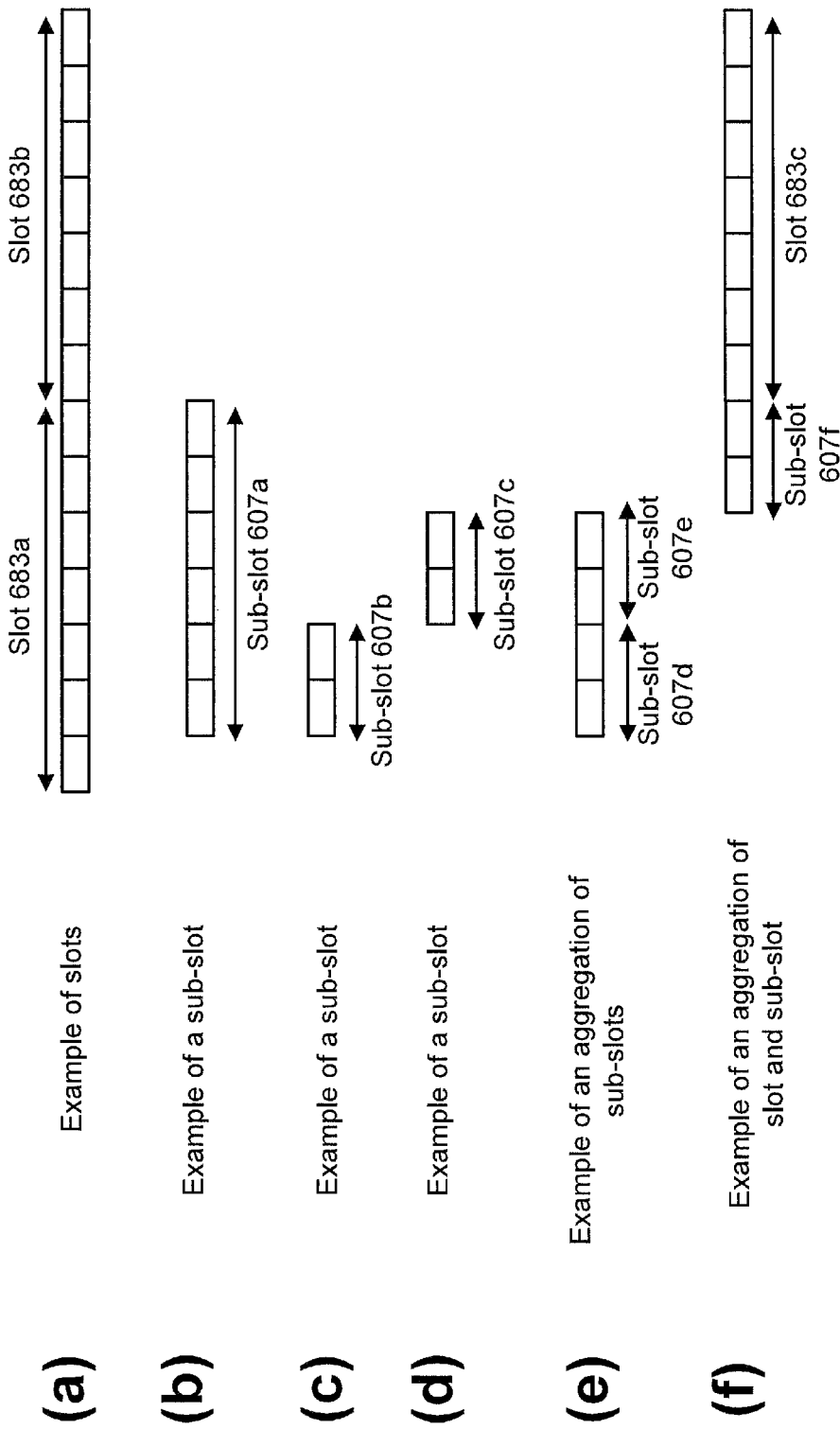
FIG. 6 shows examples of slots and sub-slots.

FIG. 6 shows examples of slots 683 and sub-slots 607. If a sub-slot 607 is not configured by higher layer, the UE 102 and the eNB and/or gNB 160 may only use a slot 683 as a scheduling unit. More specifically, a given transport block may be allocated to a slot 683. If the sub-slot 607 is configured by higher layer, the UE 102 and the eNB and/or gNB 160 may use the sub-slot 607 as well as the slot 683. The sub-slot 607 may include one or more OFDM symbols. The maximum number of OFDM symbols that constitute the sub-slot 607 may be $N^{DL}_{symb}-1$ (or $N^{UL}_{symb}-1$).

The sub-slot length may be configured by higher layer signaling. Alternatively, the sub-slot length may be indicated by a physical layer control channel (e.g., by DCI format).

The sub-slot 607 may start at any symbol within a slot 683 unless it collides with a control channel. There could be restrictions of mini-slot length based on restrictions on starting position. For example, the sub-slot 607 with the length of $N^{DL}_{symb}-1$ (or $N^{UL}_{symb}-1$) may start at the second symbol in a slot 683. The starting position of a sub-slot 607 may be indicated by a physical layer control channel (e.g., by DCI format). Alternatively, the starting position of a sub-slot 607 may be derived from information (e.g., search space index, blind decoding candidate index, frequency and/or time resource indices, PRB index, a control channel element index, control channel element aggregation level, an antenna port index, etc.) of the physical layer control channel which schedules the data in the concerned sub-slot 607.

In cases when the sub-slot 607 is configured, a given transport block may be allocated to either a slot 683, a sub-slot 607, aggregated sub-slots 607 or aggregated sub-slot(s) 607 and slot 683. This unit may also be a unit for HARQ-ACK bit generation.

Figure 7:
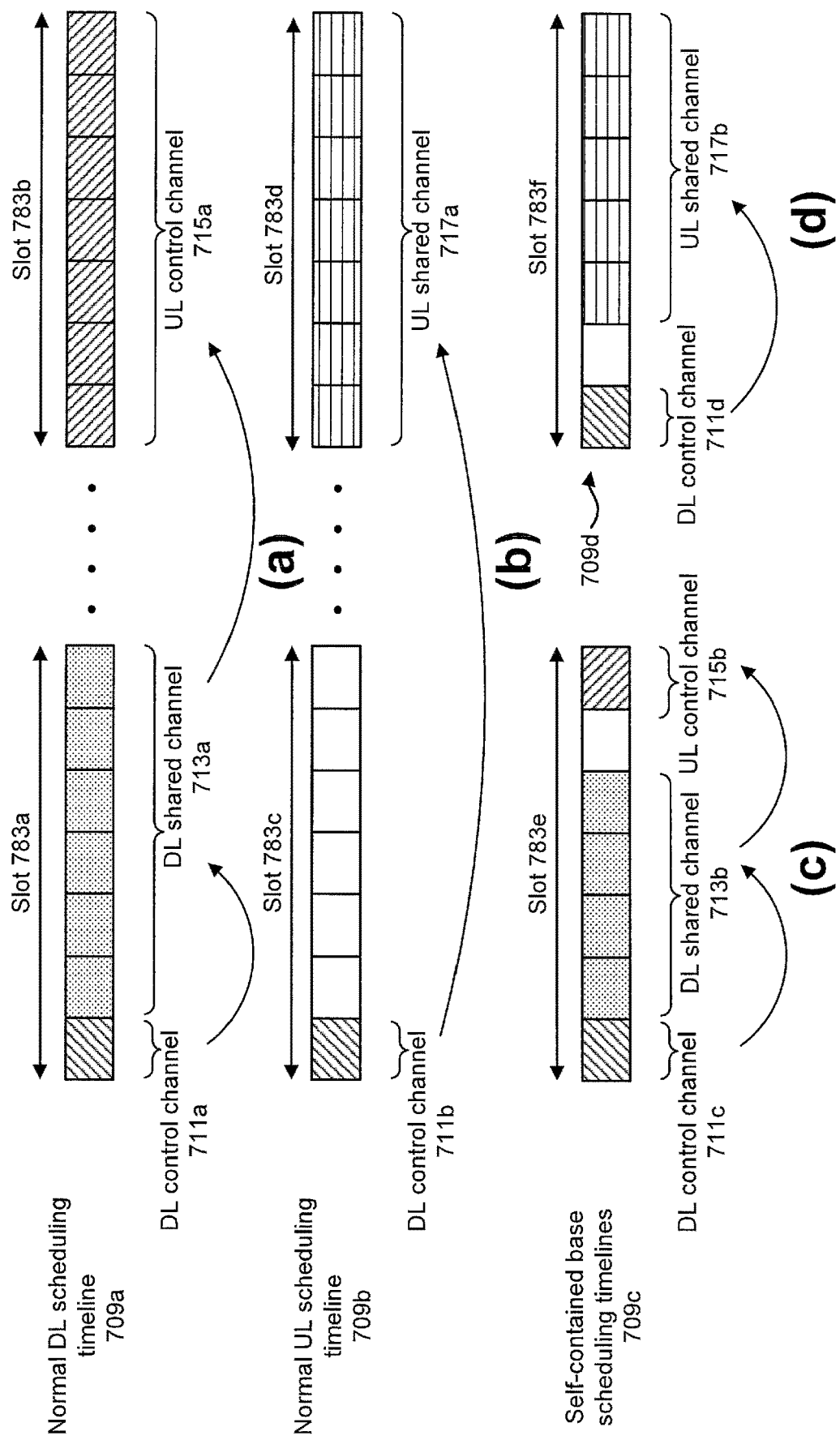
FIG. 7 shows examples of scheduling timelines.

FIG. 7 shows examples of scheduling timelines 709. For a normal DL scheduling timeline 709a, DL control channels are mapped the initial part of a slot 783a. The DL control channels 711 schedule DL shared channels 713a in the same slot 783a. HARQ-ACKs for the DL shared channels 713a (i.e., HARQ-ACKs each of which indicates whether or not transport block in each DL shared channel 713a is detected successfully) are reported via UL control channels 715a in a later slot 783b. In this instance, a given slot 783 may contain either one of DL transmission and UL transmission.

For a normal UL scheduling timeline 709b, DL control channels 711b are mapped the initial part of a slot 783c. The DL control channels 711b schedule UL shared channels 717a in a later slot 783d. For these cases, the association timing (time shift) between the DL slot 783c and the UL slot 783d may be fixed or configured by higher layer signaling. Alternatively, it may be indicated by a physical layer control channel (e.g., the DL assignment DCI format, the UL grant DCI format, or another DCI format such as UE-common signaling DCI format which may be monitored in common search space).

For a self-contained base DL scheduling timeline 709c, DL control channels 711c are mapped to the initial part of a slot 783e. The DL control channels 711c schedule DL shared channels 713b in the same slot 783e. HARQ-ACKs for the DL shared channels 713b are reported in UL control channels 715b, which are mapped at the ending part of the slot 783e.

For a self-contained base UL scheduling timeline 709d, DL control channels 711d are mapped to the initial part of a slot 783f. The DL control channels 711d schedule UL shared channels 717b in the same slot 783f. For these cases, the slot 783f may contain DL and UL portions, and there may be a guard period between the DL and UL transmissions.

The use of a self-contained slot may be upon a configuration of self-contained slot. Alternatively, the use of a self-contained slot may be upon a configuration of the sub-slot. Yet alternatively, the use of a self-contained slot may be upon a configuration of shortened physical channel (e.g., PDSCH, PUSCH, PUCCH, etc.).

Figure 8:
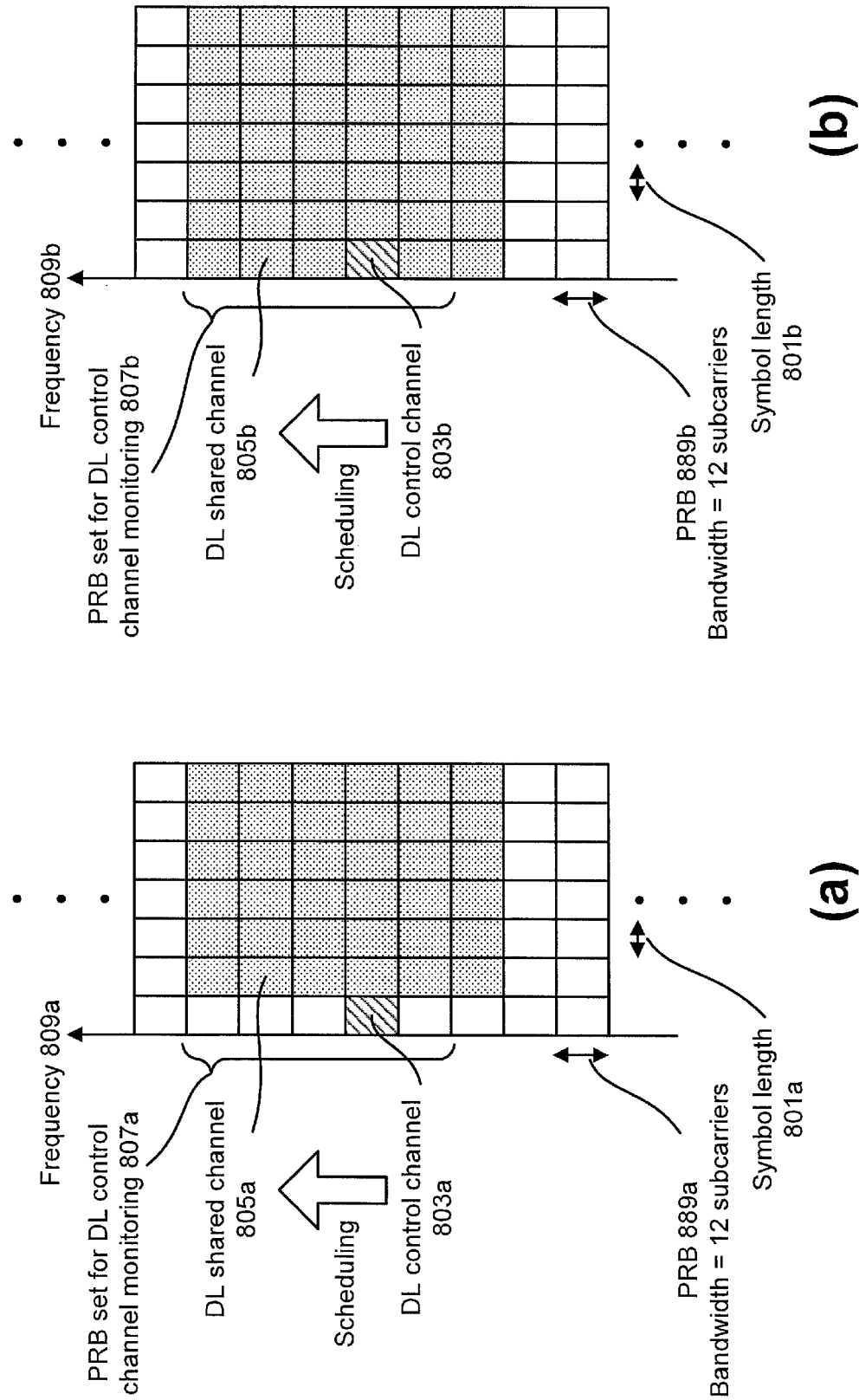
FIG. 8 shows examples of DL control channel monitoring regions.

FIG. 8 shows examples of DL control channel monitoring regions. One or more sets of PRB(s) may be configured for DL control channel monitoring. In other words, a control resource set is, in the frequency domain, a set of PRBs within which the UE 102 attempts to blindly decode downlink control information, where the PRBs may or may not be frequency contiguous, a UE 102 may have one or more control resource sets, and one DCI message may be located within one control resource set. In the frequency-domain, a PRB is the resource unit size (which may or may not include Demodulation reference signals (DMRS)) for a control channel. A DL shared channel may start at a later OFDM symbol than the one(s) which carries the detected DL control channel. Alternatively, the DL shared channel may start at (or earlier than) an OFDM symbol than the last OFDM symbol which carries the detected DL control channel. In other words, dynamic reuse of at least part of resources in the control resource sets for data for the same or a different UE 102, at least in the frequency domain may be supported.

Figure 9:
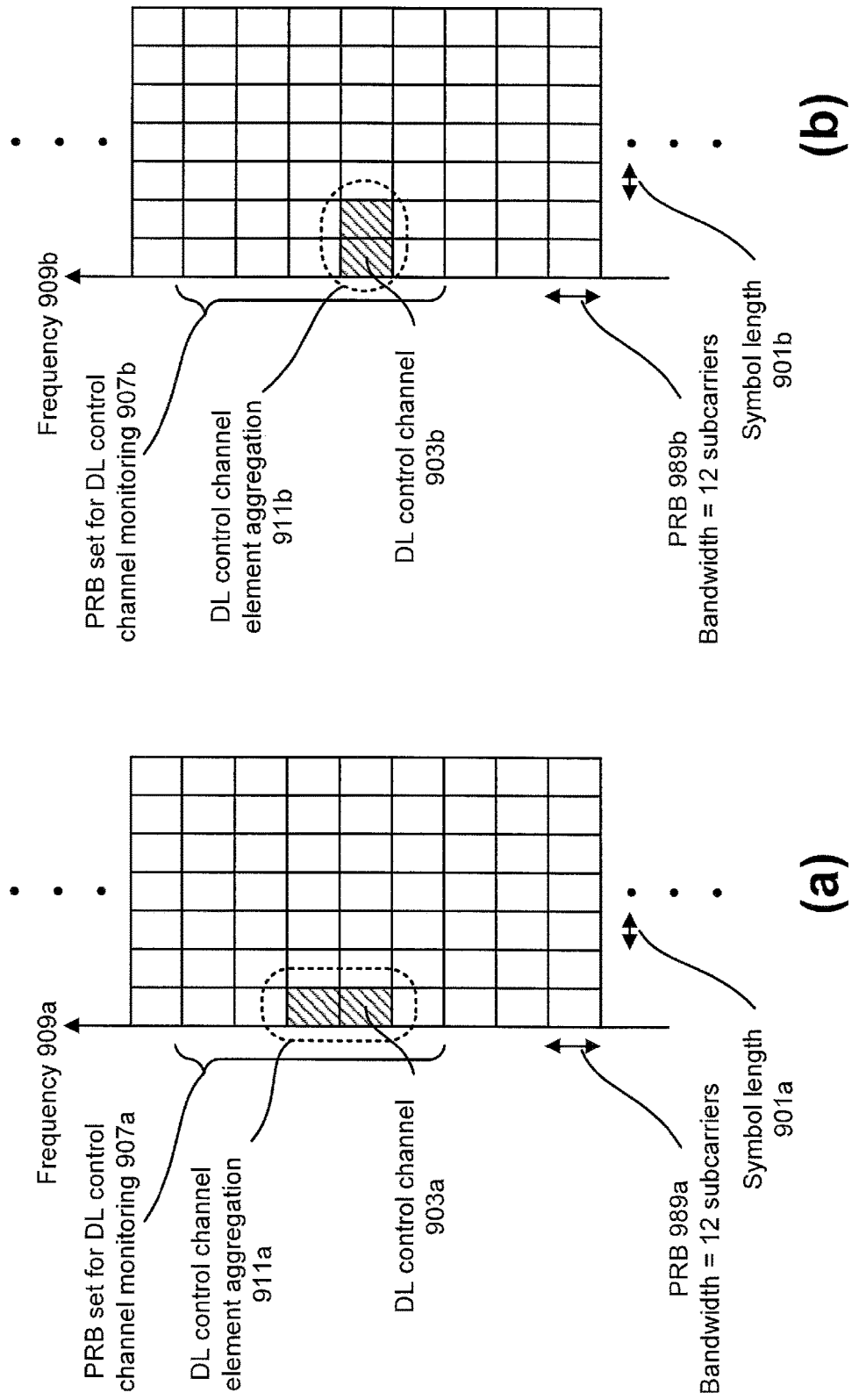
FIG. 9 shows examples of DL control channel which includes more than one control channel elements.

FIG. 9 shows examples of DL control channel which includes more than one control channel elements. When the control resource set spans multiple OFDM symbols, a control channel candidate may be mapped to multiple OFDM symbols or may be mapped to a single OFDM symbol. One DL control channel element may be mapped on REs defined by a single PRB and a single OFDM symbol. If more than one DL control channel elements are used for a single DL control channel transmission, DL control channel element aggregation may be performed.

The number of aggregated DL control channel elements is referred to as DL control channel element aggregation level. The DL control channel element aggregation level may be 1 or 2 to the power of an integer. The gNB 160 may inform a UE 102 of which control channel candidates are mapped to each subset of OFDM symbols in the control resource set. If one DL control channel is mapped to a single OFDM symbol and does not span multiple OFDM symbols, the DL control channel element aggregation is performed within an OFDM symbol, namely multiple DL control channel elements within an OFDM symbol are aggregated. Otherwise, DL control channel elements in different OFDM symbols can be aggregated.

Figure 10:
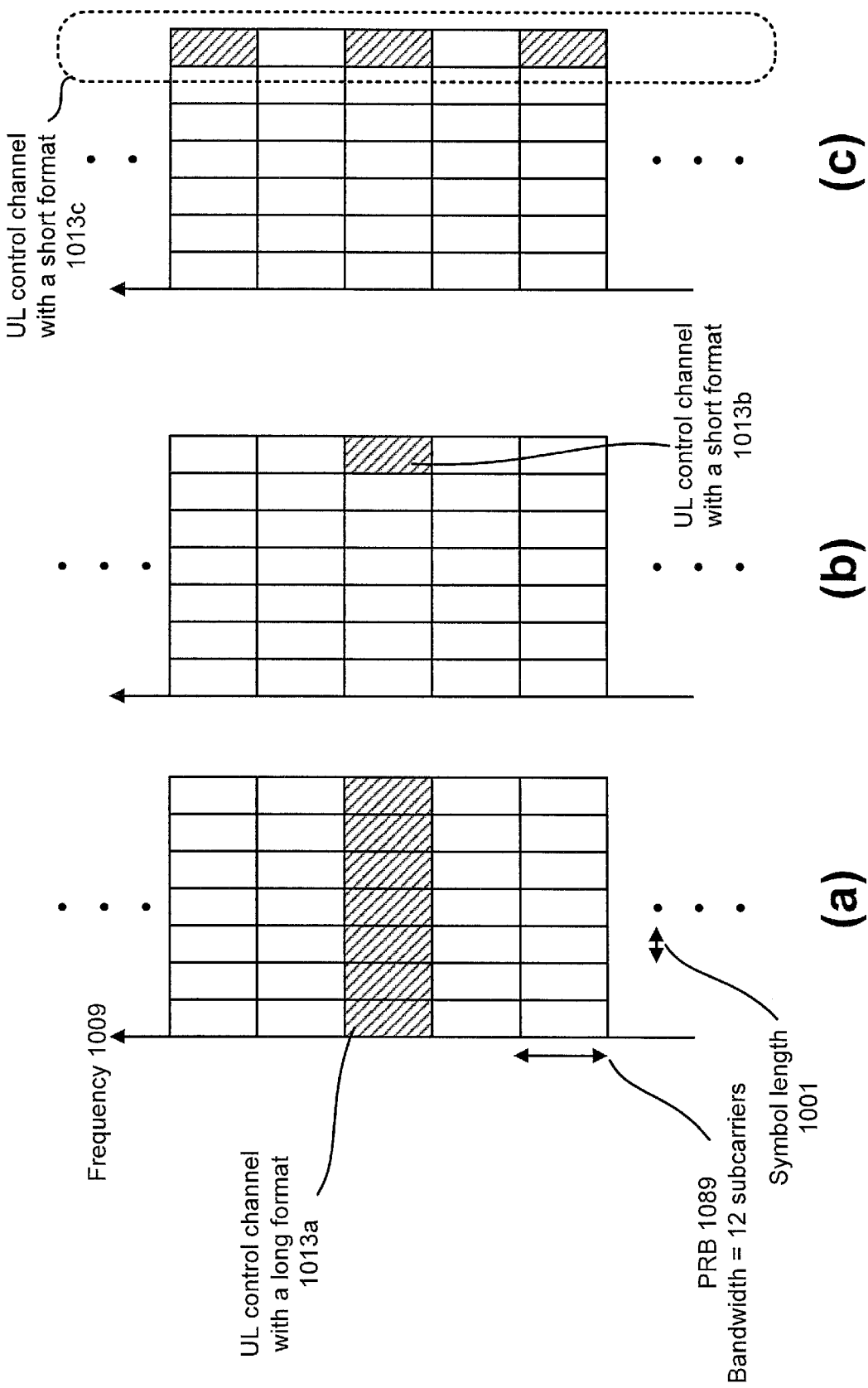
FIG. 10 shows examples of UL control channel structures.

FIG. 10 shows examples of UL control channel structures. UL control channel may be mapped on REs which are defined a PRB and a slot in frequency and time domains, respectively. This UL control channel may be referred to as a long format (or just the 1st format). UL control channels may be mapped on REs on a limited OFDM symbols in time domain. This may be referred to as a short format (or just the 2nd format). The UL control channels with a short format may be mapped on REs within a single PRB. Alternatively, the UL control channels with a short format may be mapped on REs within multiple PRBs. For example, interlaced mapping may be applied, namely the UL control channel may be mapped to every N PRBs (e.g., 5 or 10) within a system bandwidth.

Figure 11:
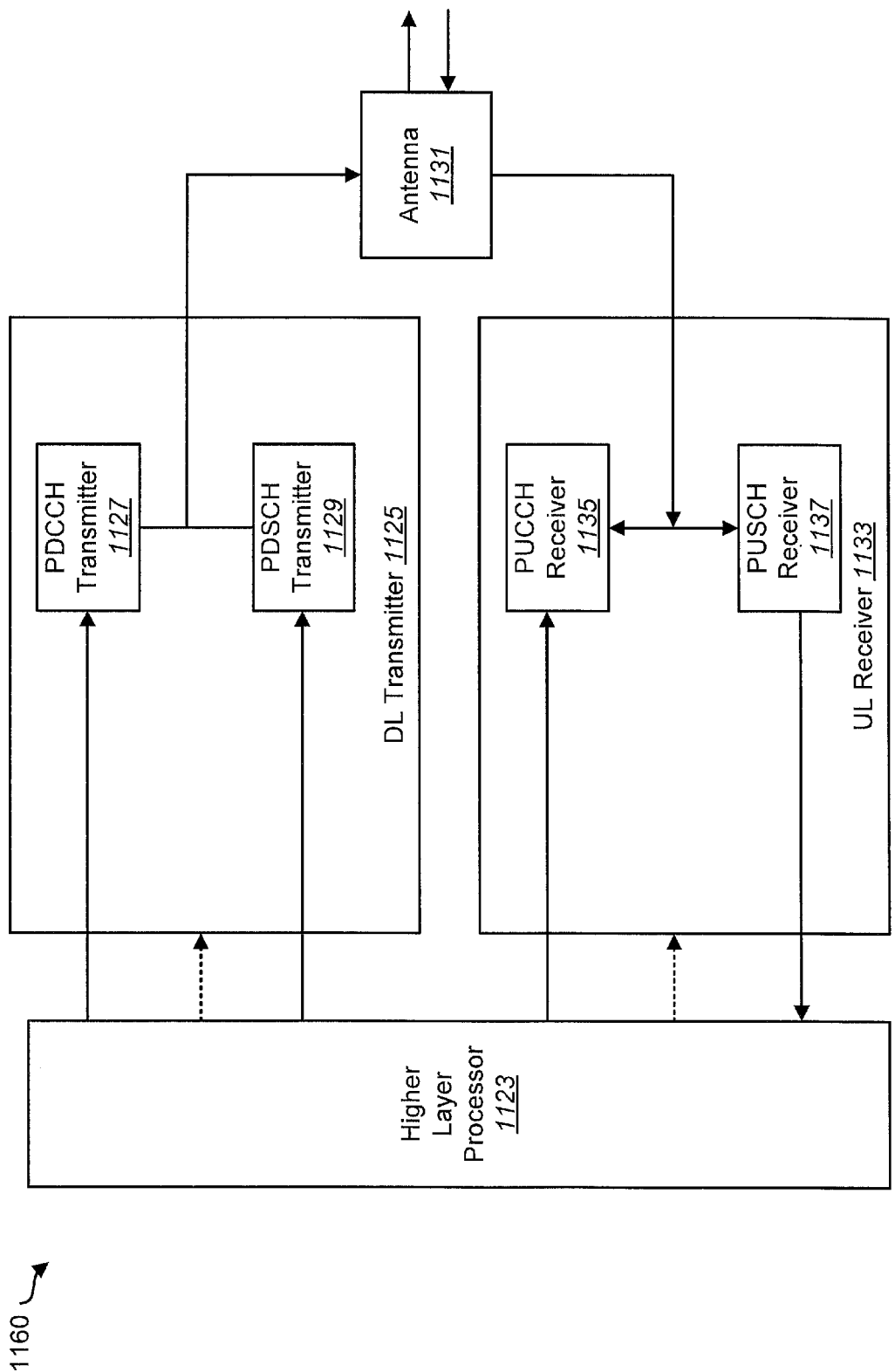
FIG. 11 is a block diagram illustrating one implementation of a gNB.

FIG. 11 is a block diagram illustrating one implementation of a gNB 1160. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send and/or acquire higher layer messages such as an RRC message and MAC message to and/or from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 12:
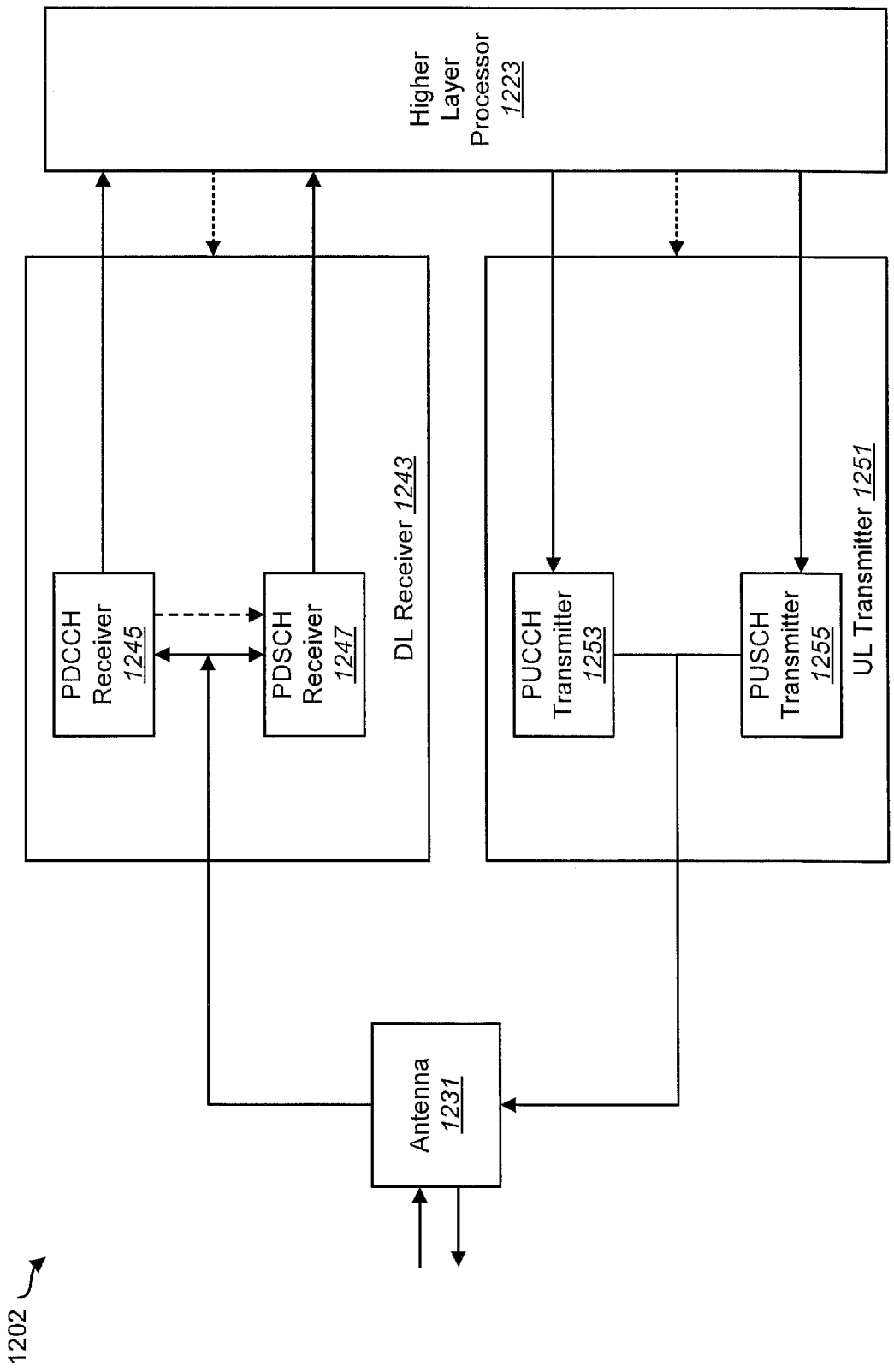
FIG. 12 is a block diagram illustrating one implementation of a UE.

FIG. 12 is a block diagram illustrating one implementation of a UE 1202. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage physical layer's behaviors (the UL transmitter's and the DL receiver's behaviors) and provide higher layer parameters to the physical layer. The higher layer processor 1223 may obtain transport blocks from the physical layer. The higher layer processor 1223 may send and/or acquire higher layer messages such as an RRC message and MAC message to and/or from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

It should be noted that names of physical channels described herein are examples. The other names such as "NRPDCCH, NRPDSCH, NRPUCCH and NRPUSCH", "new Generation-(G)PDCCH, GPDSCH, GPUCCH and GPUSCH" or the like can be used.

Figure 13:
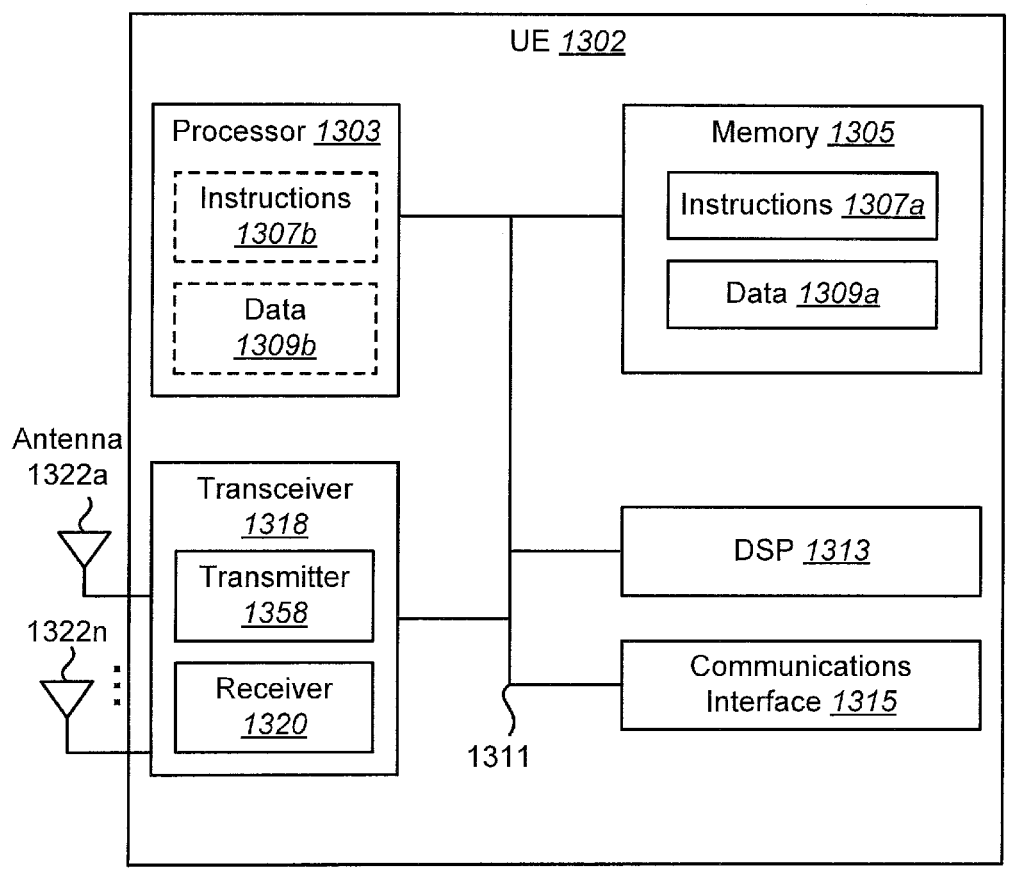
FIG. 13 illustrates various components that may be utilized in a UE.

FIG. 13 illustrates various components that may be utilized in a UE 1302. The UE 1302 described in connection with FIG. 13 may be implemented in accordance with the UE 102 described in connection with FIG. 1. The UE 1302 includes a processor 1303 that controls operation of the UE 1302. The processor 1303 may also be referred to as a central processing unit (CPU). Memory 1305, which may include read-only memory (ROM), random access memory (RAM), a combination of the two or any type of device that may store information, provides instructions 1307a and data 1309a to the processor 1303. A portion of the memory 1305 may also include non-volatile random-access memory (NVRAM). Instructions 1307b and data 1309b may also reside in the processor 1303. Instructions 1307b and/or data 1309b loaded into the processor 1303 may also include instructions 1307a and/or data 1309a from memory 1305 that were loaded for execution or processing by the processor 1303. The instructions 1307b may be executed by the processor 1303 to implement the methods described above.

The UE 1302 may also include a housing that contains one or more transmitters 1358 and one or more receivers 1320 to allow transmission and reception of data. The transmitter(s) 1358 and receiver(s) 1320 may be combined into one or more transceivers 1318. One or more antennas 1322a-n are attached to the housing and electrically coupled to the transceiver 1318.

The various components of the UE 1302 are coupled together by a bus system 1311, which may include a power bus, a control signal bus and a status signal bus, in addition to a data bus. However, for the sake of clarity, the various buses are illustrated in FIG. 13 as the bus system 1311. The UE 1302 may also include a digital signal processor (DSP) 1313 for use in processing signals. The UE 1302 may also include a communications interface 1315 that provides user access to the functions of the UE 1302. The UE 1302 illustrated in FIG. 13 is a functional block diagram rather than a listing of specific components.

Figure 14:
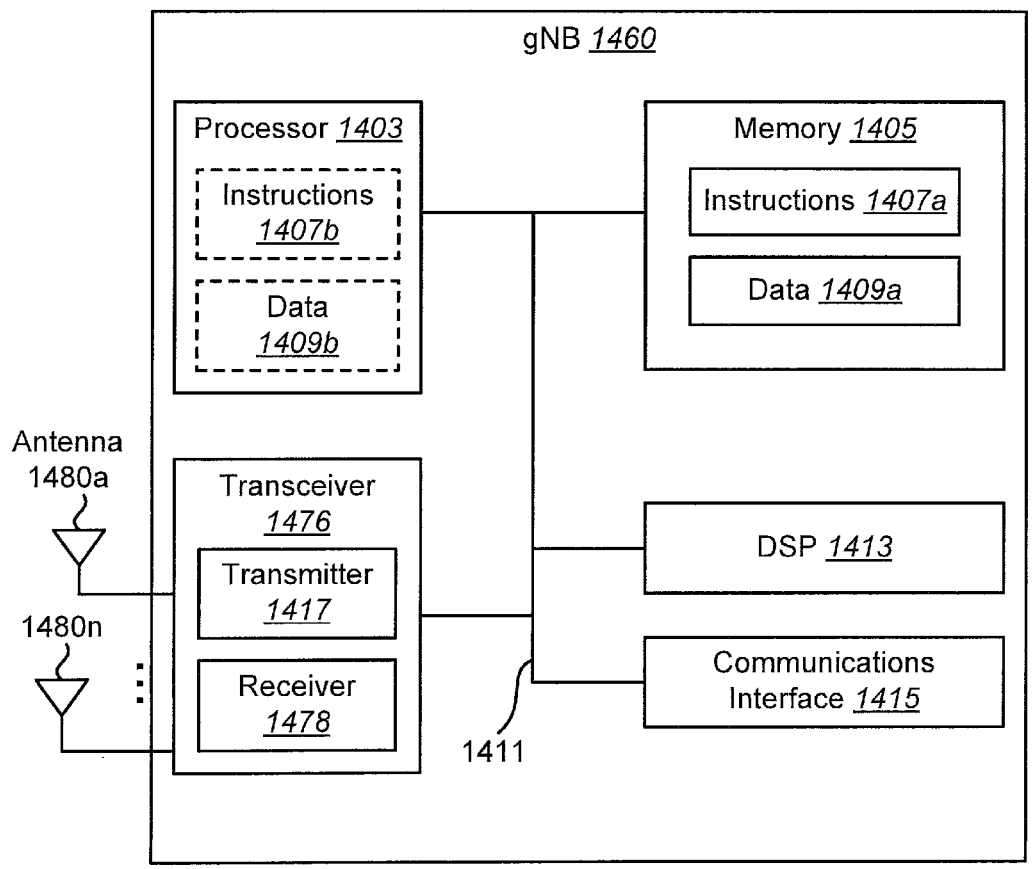
FIG. 14 illustrates various components that may be utilized in a gNB.

FIG. 14 illustrates various components that may be utilized in a gNB 1460. The gNB 1460 described in connection with FIG. 14 may be implemented in accordance with the gNB 160 described in connection with FIG. 1. The gNB 1460 includes a processor 1403 that controls operation of the gNB 1460. The processor 1403 may also be referred to as a central processing unit (CPU). Memory 1405, which may include read-only memory (ROM), random access memory (RAM), a combination of the two or any type of device that may store information, provides instructions 1407a and data 1409a to the processor 1403. A portion of the memory 1405 may also include non-volatile random-access memory (NVRAM). Instructions 1407b and data 1409b may also reside in the processor 1403. Instructions 1407b and/or data 1409b loaded into the processor 1403 may also include instructions 1407a and/or data 1409a from memory 1405 that were loaded for execution or processing by the processor 1403. The instructions 1407b may be executed by the processor 1403 to implement the methods described above.

The gNB 1460 may also include a housing that contains one or more transmitters 1417 and one or more receivers 1478 to allow transmission and reception of data. The transmitter(s) 1417 and receiver(s) 1478 may be combined into one or more transceivers 1476. One or more antennas 1480a-n are attached to the housing and electrically coupled to the transceiver 1476.

The various components of the gNB 1460 are coupled together by a bus system 1411, which may include a power bus, a control signal bus and a status signal bus, in addition to a data bus. However, for the sake of clarity, the various buses are illustrated in FIG. 14 as the bus system 1411. The gNB 1460 may also include a digital signal processor (DSP) 1413 for use in processing signals. The gNB 1460 may also include a communications interface 1415 that provides user access to the functions of the gNB 1460. The gNB 1460 illustrated in FIG. 14 is a functional block diagram rather than a listing of specific components.

Figure 15:
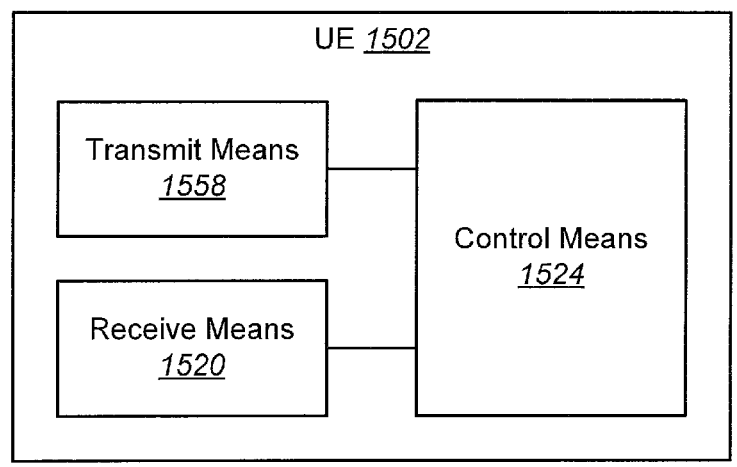
FIG. 15 is a block diagram illustrating one implementation of a UE in which systems and methods that achieve mini-slot-based repetitions.

FIG. 15 is a block diagram illustrating one implementation of a UE 1502 in which systems and methods that achieve mini-slot-based repetitions. The UE 1502 includes transmit means 1558, receive means 1520 and control means 1524. The transmit means 1558, receive means 1520 and control means 1524 may be configured to perform one or more of the functions described in connection with FIG. 1 above. FIG. 13 above illustrates one example of a concrete apparatus structure of FIG. 15. Other various structures may be implemented to realize one or more of the functions of FIG. 1. For example, a DSP may be realized by software.

Figure 16:
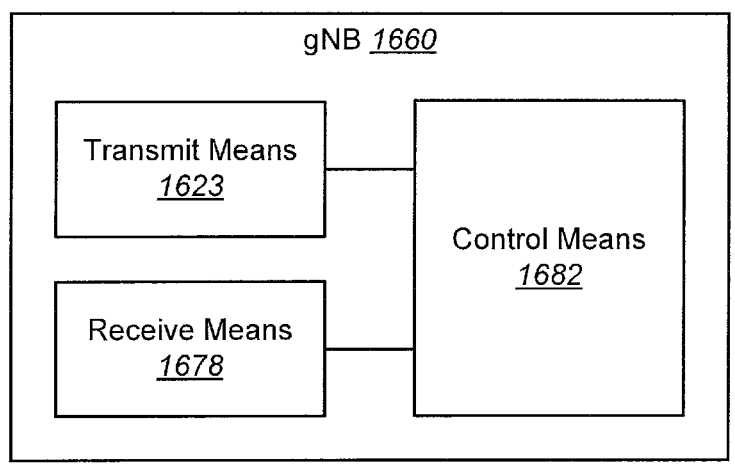
FIG. 16 is a block diagram illustrating one implementation of a gNB in which systems and methods that achieve mini-slot-based repetitions.

FIG. 16 is a block diagram illustrating one implementation of a gNB 1660 in which systems and methods that achieve mini-slot-based repetitions. The gNB 1660 includes transmit means 1623, receive means 1678 and control means 1682. The transmit means 1623, receive means 1678 and control means 1682 may be configured to perform one or more of the functions described in connection with FIG. 1 above. FIG. 14 above illustrates one example of a concrete apparatus structure of FIG. 16. Other various structures may be implemented to realize one or more of the functions of FIG. 1. For example, a DSP may be realized by software.

Figure 17:
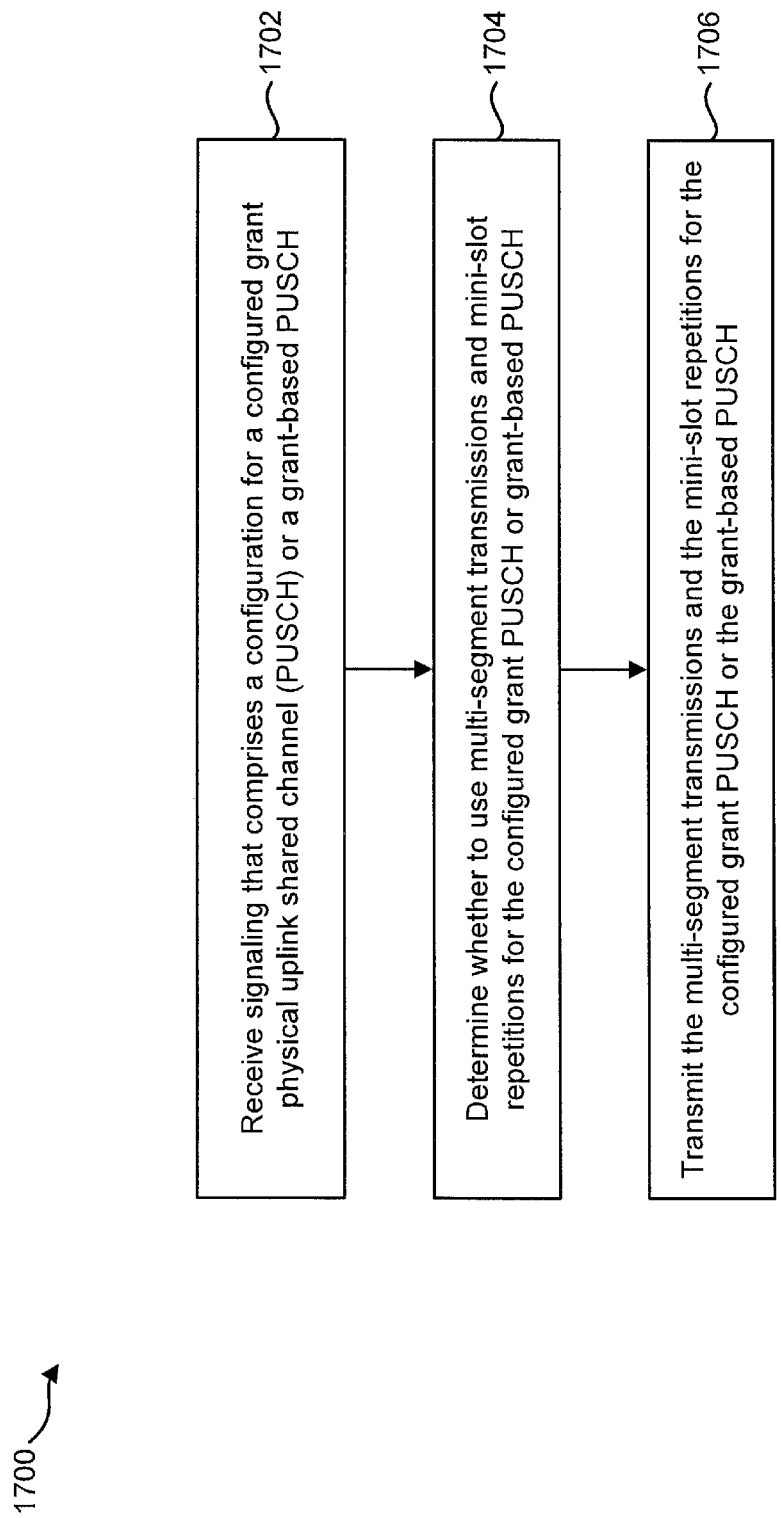
FIG. 17 is a flow diagram illustrating a method by a UE.

FIG. 17 is a flow diagram illustrating a method 1700 by a user equipment (UE) 102. The UE 102 may receive 1702 signaling that comprises a configuration for a configured grant physical uplink shared channel (PUSCH) or a grant-based PUSCH. The UE 102 may determine 1704 whether to use multi-segment transmissions and mini-slot repetitions for the configured grant PUSCH or grant-based PUSCH. The UE 102 may transmit 1706 the multi-segment transmissions and the mini-slot repetitions for the configured grant PUSCH or the grant-based PUSCH.

In one approach, one or more actual PUSCH repetitions in one slot, or two or more actual PUSCH repetitions across slot boundary in consecutive available slots, are supported using one uplink (UL) grant for the grant-based PUSCH and one configured grant configuration for the configured grant PUSCH.

In another approach, one or more PUSCH repetitions in one slot, or two or more PUSCH repetitions across slot boundary in consecutive available slots, are supported using one UL grant for the grant-based PUSCH and one configured grant configuration for the configured grant PUSCH.

Figure 18:
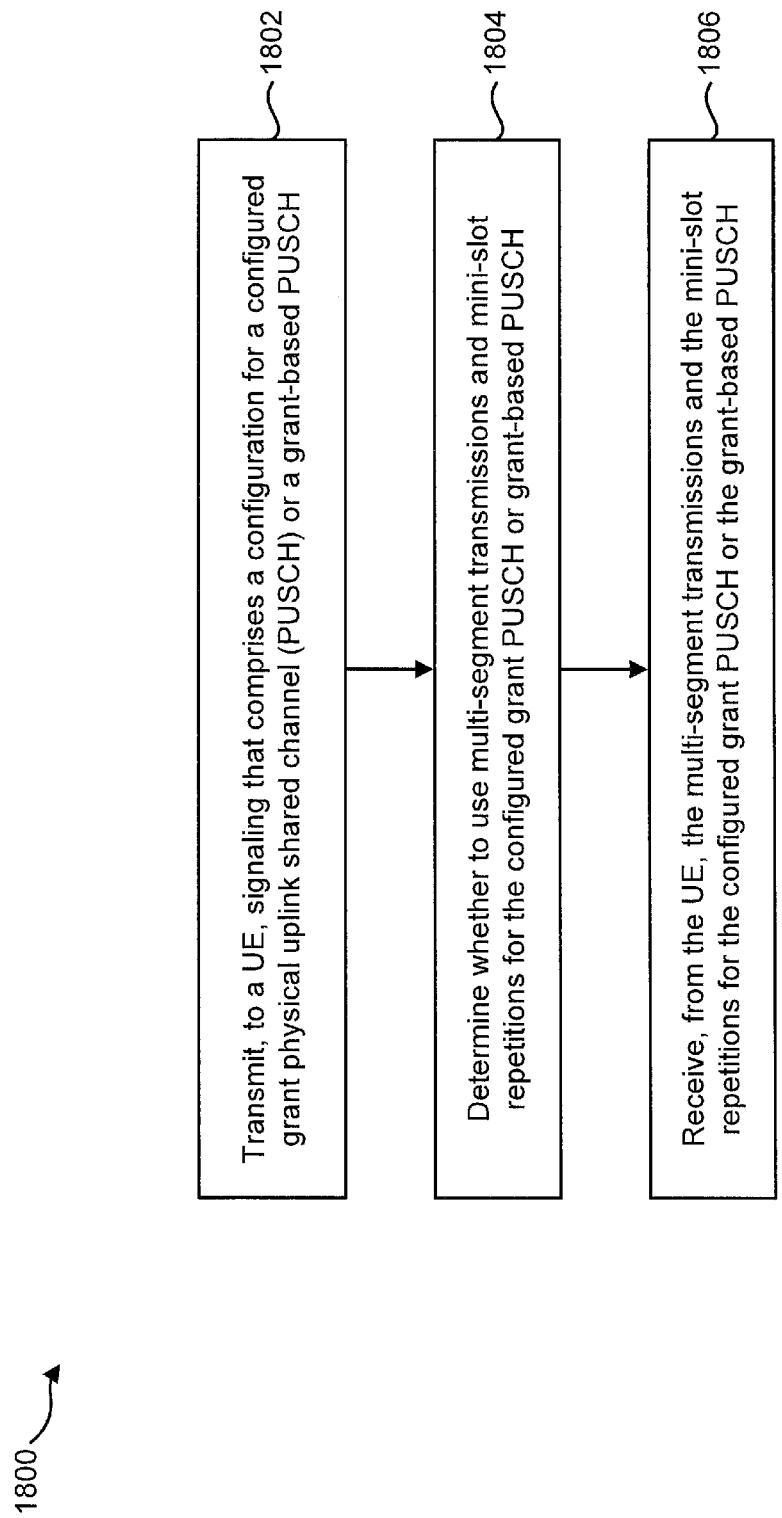
FIG. 18 is a flow diagram illustrating a method by gNB.

FIG. 18 is a flow diagram illustrating a method 1800 by a base station (gNB) 160. The gNB 160 may transmit 1802, to a user equipment (UE) 102, signaling that comprises a configuration for a configured grant physical uplink shared channel (PUSCH) or a grant-based PUSCH. The gNB 160 may determine 1804 determine whether to use multi-segment transmissions and mini-slot repetitions for the configured grant PUSCH or the grant-based PUSCH. The gNB 160 may receive 1806 the multi-segment transmissions and the mini-slot repetitions for the configured grant PUSCH or the grant-based PUSCH.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed.

Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described above may be realized as an LSI that is a typical integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semi-conductor technology, a technology of an integrated circuit that substitutes for the LSI appears, it is also possible to use an integrated circuit to which the technology applies.

Moreover, each functional block or various features of the base station device and the terminal device used in each of the aforementioned implementations may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

In one example, a user equipment (UE), comprising: receiving circuitry configured to receive signaling that comprises a configuration for a configured grant physical uplink shared channel (PUSCH) or a grant-based PUSCH; a higher layer processor configured to determine whether to use multi-segment transmissions and mini-slot repetitions for the configured grant PUSCH or grant-based PUSCH; and transmitting circuitry configured to transmit the multi-segment transmissions and the mini-slot repetitions for the configured grant PUSCH or grant-based PUSCH.

In one example, the UE, wherein one or more actual PUSCH repetitions in one slot, or two or more actual PUSCH repetitions across slot boundary in consecutive available slots, are supported using one uplink (UL) grant for the grant-based PUSCH and one configured grant configuration for the configured grant PUSCH.

In one example, the UE, wherein one or more PUSCH repetitions in one slot, or two or more PUSCH repetitions across slot boundary in consecutive available slots, are supported using one UL grant for the grant-based PUSCH and one configured grant configuration for the configured grant PUSCH.

In one example, a base station (gNB), comprising: transmitting circuitry configured to transmit, to a user equipment (UE), signaling that comprises a configuration for a configured grant physical uplink shared channel (PUSCH) or a grant-based PUSCH; a higher layer processor configured to determine whether to use multi-segment transmissions and mini-slot repetitions for the configured grant PUSCH or the grant-based PUSCH; and receiving circuitry configured to receive, from the UE, the multi-segment transmissions and the mini-slot repetitions for the configured grant PUSCH or the grant-based PUSCH.

In one example, the gNB, wherein one or more actual PUSCH repetitions in one slot, or two or more actual PUSCH repetitions across slot boundary in consecutive available slots, are supported using one uplink (UL) grant for the grant-based PUSCH and one configured grant configuration for the configured grant PUSCH.

In one example, the gNB, wherein one or more PUSCH repetitions in one slot, or two or more PUSCH repetitions across slot boundary in consecutive available slots, are supported using one UL grant for the grant-based PUSCH and one configured grant configuration for the configured grant PUSCH.

In one example, a method by a user equipment (UE), comprising: receiving signaling that comprises a configuration for a configured grant physical uplink shared channel (PUSCH) or a grant-based PUSCH; determining whether to use multi-segment transmissions and mini-slot repetitions for the configured grant PUSCH or then grant-based PUSCH; and transmitting the multi-segment transmissions and the mini-slot repetitions for the configured grant PUSCH or the grant-based PUSCH.

In one example, a method by a base station (gNB), comprising: transmitting, to a user equipment (UE), signaling that comprises a configuration for a configured grant physical uplink shared channel (PUSCH) or a grant-based PUSCH; determining whether to use multi-segment transmissions and mini-slot repetitions for the configured grant PUSCH or then grant-based PUSCH; and receiving, from the UE, the multi-segment transmissions and the mini-slot repetitions for the configured grant PUSCH or the grant-based PUSCH.

In one example, a user equipment (UE) that communicates with a base station comprising: receiving circuitry configured to: receive a Radio Resource Control (RRC) message including first information indicating a repetition type for configured grant (CG) Physical Uplink Shared Channel (PUSCH) transmission(s), receive a RRC message including second information indicating a repetition type for grant based (GB) PUSCH transmission(s), transmitting circuitry configured to: perform the CG PUSCH transmission(s) based on the first information, perform, based on a detection of a physical downlink control channel (PDCCH) with Cyclic Redundancy Check (CRC) scrambled by Cell Radio Network Temporary Identifier (C-RNTI), the GB PUSCH transmission(s) based on the second information, perform, based on a detection of a PDCCH with CRC scrambled by Configured Scheduling Radio Network Temporary Identifier (CS-RNTI) with New Data Indicator (NDI)= 1, a retransmission(s) of the CG PUSCH transmission(s) based on the second information.

In one example, a base station apparatus that communicates with a user equipment (UE) comprising: transmitting circuitry configured to: transmit a Radio Resource Control (RRC) message including first information indicating a repetition type for configured grant (CG) Physical Uplink Shared Channel (PUSCH) transmission(s), transmit a RRC message including second information indicating a repetition type for grant based (GB) PUSCH transmission(s), receiving circuitry configured to: receive the CG PUSCH transmission(s) based on the first information, receive, based on a transmission of a physical downlink control channel (PDCCH) with Cyclic Redundancy Check (CRC) scrambled by Cell Radio Network Temporary Identifier (C-RNTI), the GB PUSCH transmission(s) based on the second information, receive, based on a transmission of a PDCCH with CRC scrambled by Configured Scheduling Radio Network Temporary Identifier (CS-RNTI) with New Data Indicator (NDI)=1, a retransmission(s) of the CG PUSCH transmission(s) based on the second information.

In one example, a communication method of a user equipment comprising: receiving a Radio Resource Control (RRC) message including first information indicating a repetition type for configured grant (CG) Physical Uplink Shared Channel (PUSCH) transmission(s), receiving a RRC message including second information indicating a repetition type for grant based (GB) PUSCH transmission(s), performing the CG PUSCH transmission(s) based on the first information, performing, based on a detection of a physical downlink control channel (PDCCH) with Cyclic Redundancy Check (CRC) scrambled by Cell Radio Network Temporary Identifier (C-RNTI), the GB PUSCH transmission(s) based on the second information, performing, based on a detection of a PDCCH with CRC scrambled by Configured Scheduling Radio Network Temporary Identifier (CS-RNTI) with New Data Indicator (NDI)=1, a retransmission(s) of the CG PUSCH transmission(s) based on the second information.

In one example, a communication method of a base station apparatus comprising: transmitting a Radio Resource Control (RRC) message including first information indicating a repetition type for configured grant (CG) Physical Uplink Shared Channel (PUSCH) transmission(s), transmitting a RRC message including second information indicating a repetition type for grant based (GB) PUSCH transmission(s), receiving circuitry configured to: receiving the CG PUSCH transmission(s) based on the first information, receiving, based on a transmission of a physical downlink control channel (PDCCH) with Cyclic Redundancy Check (CRC) scrambled by Cell Radio Network Temporary Identifier (C-RNTI), the GB PUSCH transmission(s) based on the second information, receiving, based on a transmission of a PDCCH with CRC scrambled by Configured Scheduling Radio Network Temporary Identifier (CS-RNTI) with New Data Indicator (NDI)=1, a retransmission(s) of the CG PUSCH transmission(s) based on the second information.

CROSS REFERENCE

This Nonprovisional application claims priority under 35 U.S.C. § 119 on provisional Application No. 62,904,868 on Sep. 24, 2019, the entire contents of which are hereby incorporated by reference.

What is claimed is:

1. A user equipment (UE) that communicates with a base station comprising:
   receiving circuitry configured to:
      receive a Radio Resource Control (RRC) message including first information indicating a repetition type for a configured grant (CG) Physical Uplink Shared Channel (PUSCH) transmission, the RRC message further including second information indicating a repetition type for a grant based (GB) PUSCH transmission(s); and
   transmitting circuitry configured to:
      perform the CG PUSCH transmission(s) based on the first information,
      perform, based on a detection of a physical downlink control channel (PDCCH) with Cyclic Redundancy Check (CRC) scrambled by Cell Radio Network Temporary Identifier (C-RNTI), the GB PUSCH transmission(s) based on the second information, and
      perform, based on a detection of a PDCCH with CRC scrambled by Configured Scheduling Radio Network Temporary Identifier (CS-RNTI) with New Data Indicator (NDI)=1, a retransmission(s) of the CG PUSCH transmission(s) based on the second information.

2. A base station apparatus that communicates with a user equipment comprising:
   transmitting circuitry configured to:
      transmit a Radio Resource Control (RRC) message including first information indicating a repetition type for a configured grant (CG) Physical Uplink Shared Channel (PUSCH) transmission, the RRC message further including second information indicating a repetition type for a grant based (GB) PUSCH transmission(s); and
   receiving circuitry configured to:
      receive the CG PUSCH transmission(s) based on the first information,
      receive, based on a transmission of a physical downlink control channel (PDCCH) with Cyclic Redundancy Check (CRC) scrambled by Cell Radio Network Temporary Identifier (C-RNTI), the GB PUSCH transmission(s) based on the second information, and
      receive, based on a transmission of a PDCCH with CRC scrambled by Configured Scheduling Radio Network Temporary Identifier (CS-RNTI) with New Data Indicator (NDI)=1, a retransmission of the CG PUSCH transmission based on the second information.

3. A communication method of a user equipment comprising:
- receiving a Radio Resource Control (RRC) message including first information indicating a repetition type for a configured grant (CG) Physical Uplink Shared Channel (PUSCH) transmission,
- the RRC message further including second information indicating a repetition type for a grant based (GB) PUSCH transmission;
- performing the CG PUSCH transmission based on the first information;
- performing, based on a detection of a physical downlink control channel (PDCCH) with Cyclic Redundancy Check (CRC) scrambled by Cell Radio Network Temporary Identifier (C-RNTI), the GB PUSCH transmission based on the second information; and
- performing, based on a detection of a PDCCH with CRC scrambled by Configured Scheduling Radio Network Temporary Identifier (CS-RNTI) with New Data Indicator (NDI)=1, a retransmission of the CG PUSCH transmission based on the second information.

\* \* \* \* \*